(12) United States Patent
Kondo et al.

(10) Patent No.: US 8,215,463 B2
(45) Date of Patent: Jul. 10, 2012

(54) VARIABLE DAMPING-FORCE DAMPER AND MANUFACTURING METHOD OF THE SAME

(75) Inventors: Yohei Kondo, Saitama (JP); Hidetoshi Amano, Saitama (JP); Shinji Yamashita, Saitama (JP); Hajime Kajiwara, Saitama (JP); Hiroshi Ogasa, Saitama (JP); Yoshitomo Azekatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 685 days.

(21) Appl. No.: 12/322,925

(22) Filed: Feb. 9, 2009

(65) Prior Publication Data
US 2009/0200126 A1 Aug. 13, 2009

(30) Foreign Application Priority Data

Feb. 12, 2008 (JP) .................. 2008-030763
Mar. 31, 2008 (JP) .................. 2008-089065
Jun. 9, 2008 (JP) .................. 2008-150528

(51) Int. Cl.
*F16F 9/53* (2006.01)
(52) U.S. Cl. ............ 188/267.2; 188/322.16; 188/322.19
(58) Field of Classification Search ............... 188/267.2, 188/267.1, 322.16, 322.17, 322.18, 322.19, 188/322.22; 267/64.11, 64.15
See application file for complete search history.

(56) References Cited

U.S. PATENT DOCUMENTS

| | | | | |
|---|---|---|---|---|
| 5,590,745 A * | 1/1997 | Rensel et al. | ............... | 188/267.1 |
| 5,897,965 A | 4/1999 | Itoh et al. | | |
| 6,390,258 B1 * | 5/2002 | Hofmann et al. | ........ | 188/322.17 |
| 6,464,051 B2 | 10/2002 | Lisenker et al. | | |
| 6,516,926 B2 | 2/2003 | Lisenker et al. | | |
| 2005/0108878 A1 | 5/2005 | Nishimura et al. | | |

FOREIGN PATENT DOCUMENTS

| | | |
|---|---|---|
| JP | 61-021439 A | 1/1986 |
| JP | 05-42715 U | 6/1993 |
| JP | 8-158058 A | 6/1996 |
| JP | 09-053722 | 2/1997 |
| JP | 11-280818 A | 10/1999 |
| JP | 2000-514161 | 10/2000 |
| JP | 2003-232453 | 8/2003 |
| JP | 2005-155673 A | 6/2005 |
| JP | 2006-220265 A | 8/2006 |
| JP | 2007-255023 A | 9/2007 |
| WO | WO 98/00653 | 1/1998 |

* cited by examiner

*Primary Examiner* — Pamela Rodriguez
(74) *Attorney, Agent, or Firm* — Carrier Blackman & Associates, P.C.; Joseph P. Carrier; William D. Blackman

(57) ABSTRACT

A variable damping-force damper includes a cylinder tube filled with magnetic particles (MRF), a piston that is slidably disposed within the cylinder tube, a piston rod connected with the piston and is disposed so as to protrude out of one end of the cylinder tube and a rod guide that closes one end of the cylinder tube and slidably supports the piston rod. The cylinder tube has a Ni plating film whose Vickers hardness is 800 VHN or more on its inner peripheral surface and the piston slides relative to the Ni plating film. The rod guide has a structure having a predetermined base material portion and a fluorine resin contained Ni plating film that is treated by heat and is provided on the surface of the base material portion. The piston rod slides relative to the fluorine resin contained Ni plating film.

11 Claims, 14 Drawing Sheets

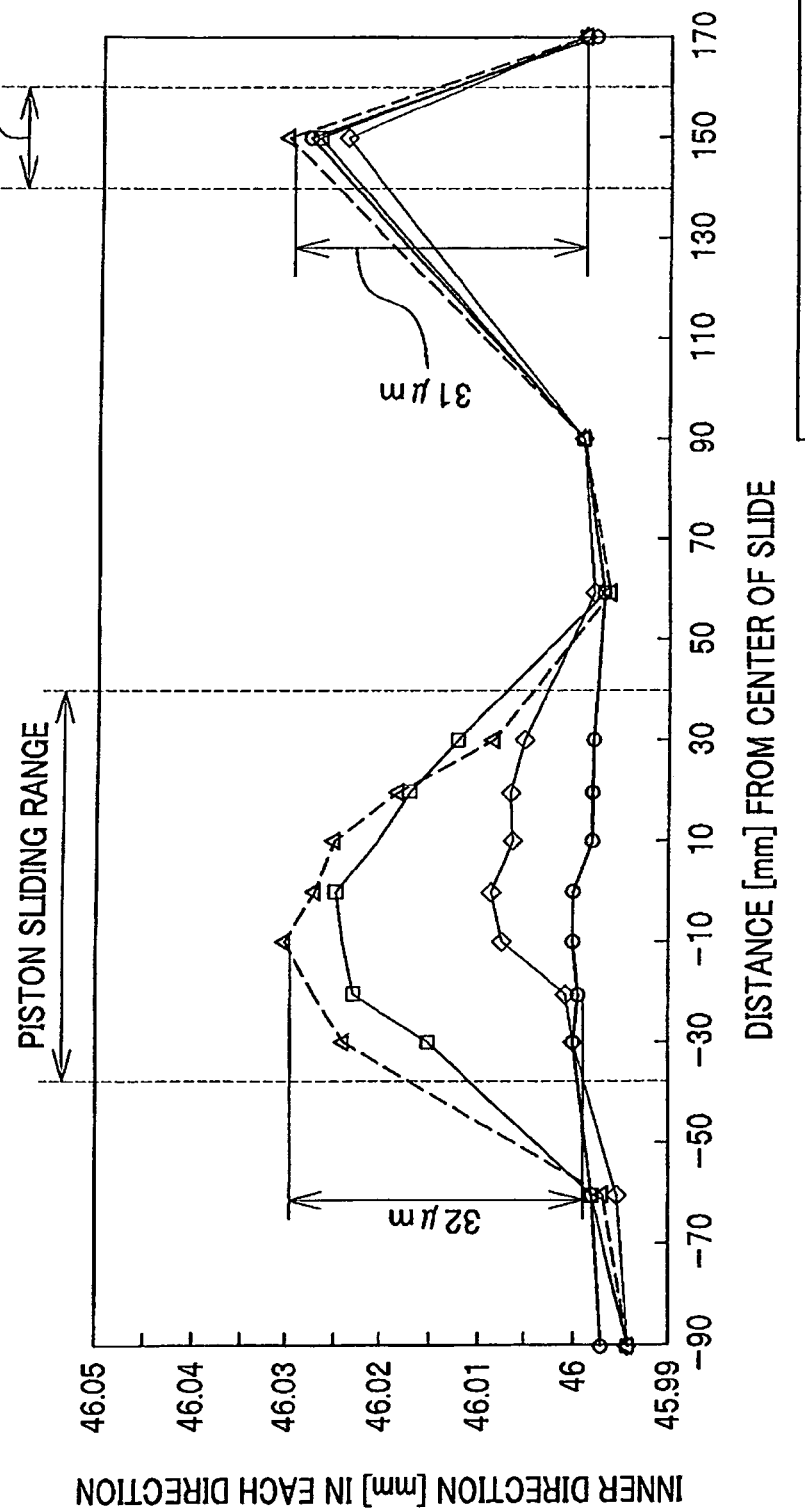

VARIABLE DAMPING-FORCE DAMPER AND MANUFACTURING METHOD OF THE SAME

CROSS REFERENCE TO RELATED APPLICATIONS

The present application claims the benefit under 35 U.S.C. 119 of Japanese Patent Application 2008-30763 filed on Feb. 12, 2008, Japanese Patent Application 2008-89065 filed on Mar. 31, 2008 and Japanese Patent Application 2008-150528 filed on Jun. 9, 2008, the disclosures of which are incorporated in this application by reference.

BACKGROUND OF THE INVENTION

1. Field of the Invention

The present invention relates to a variable damping-force damper and more specifically to a variable damping-force damper for use in damping vibrations of a vehicle or the like for example as well as to a manufacturing method of the same.

2. Description of Related Art

There is known a variable damping-force damper using a MRF (Magneto-Rheological Fluid) as a working fluid in which spherical particles having an average size of around several μm and ferromagnetism (referred to as "magnetic particle" hereinafter) are dispersed as a dispersed material in oil such as mineral oil, i.e., a dispersant medium (this variable damping-force damper will be referred to as a "MRF damper" hereinafter).

Although the MRF is a liquid similar to a general hydraulic working oil and behaves as a Newtonian fluid when no magnetic filed is applied to the MRF, the magnetic particles dispersed homogeneously within the MRF concatenate along a direction of a magnetic filed and form chain-like clusters when the magnetic field is applied from the outside. Because the clusters resist against deformation (flow), an apparent viscosity of the MRF sharply increases and the MRF behaves like a plastic fluid having yield stress when it flows. Such change of viscosity caused by the magnetic field of the MRF is reversible. It is also possible to control the degree of the viscosity of the MRF by controlling intensity of the magnetic field. This change in state of the MRF occurs very quickly and its response to the change of the magnetic field is in order of several milliseconds.

Generally, the MRF damper having the MRF is constructed as follows. That is, a piston partitions an inside of a cylinder tube filled with the MRF into first and second oil chambers (first and second chambers). The piston is connected with a piston rod that projects out of one end of the cylinder tube. A rod guide that is disposed so as to close one end of the cylinder tube slidably supports the piston rod.

The piston is provided with a communication hole that circulates the MRF between the first and second oil chambers. The piston also contains an electromagnetic coil for applying a magnetic field to the MRF within the communication hole. The viscosity of the MRF may be changed and a variable damping force may be obtained by controlling magnitude of the magnetic field applied to the MRF within the communication hole by power fed to the electromagnetic coil.

The piston slides relative to the cylinder tube during when the MRF damper operates, so that the magnetic particles within the MRF collide against an inner peripheral surface of the cylinder tube and an outer peripheral surface of the piston, causing a rubbing action. Because iron powder and other is used as the magnetic particles, the rubbing action largely affects the cylinder tube and the piston if they are made of materials whose hardness is smaller than iron. That is, sliding surfaces of the cylinder tube and the piston are largely abraded and it becomes difficult to generate the damping force.

Then, U.S. Pat. No. 6,464,051 has proposed a configuration of forming a Ni plating film on an inner peripheral surface of the cylinder tube into which the MRF is charged by implementing an electroless nickel (Ni) plating at first and then forming a Cr plating film by plating chrome (Cr) on the surface of the Ni plating film. While Vickers hardness of the Ni plating film formed by means of the electroless Ni plating is about 550 to 700 VHN (Vickers Hardness Number), Vickers hardness of the Cr plating film formed by means of Cr plating is about 900 to 1000 VHN. Thus, U.S. Pat. No. 6,464,051 suppresses the abrasion of the cylinder tube otherwise caused by the magnetic particles by providing the Cr plating film whose hardness is large on the sliding surface of the cylinder tube.

When the MRF damper is driven, not only the piston slides relative to the cylinder tube but also its piston rod slides relative to the rod guide. Therefore, a technology for keeping sliding resistance (friction) between the piston rod and the rod guide low and for suppressing abrasion of the both sliding surfaces of the piston rod and the rod guide is required.

Then, JPA2000-514161 has disclosed a configuration in which a metal bush that functions as a sealing member and a lubricant member is disposed between the piston rod and the rod guide. More specifically, the metal bush having a structure in which a porous layer made of bronze is provided on an inner peripheral surface of a base material made of non-magnetic metal and in which fluorine resin is immersed in the porous layer is used to slide the fluorine resin immersed layer relative to the piston rod. Note that it is necessary to construct the MRF damper so that no magnetic field acts on the MRF in parts other than the communication hole in order to obtain the variable damping-force by changing the viscosity of the MRF within the communication hole provided in the piston. Therefore, the non-magnetic metal is used as the base material of the metal bush.

Still more, surface roughness of the piston rod is important in the MRF damper from aspects of damping performance and durability of the damper. That is, while the sealing member is provided on the inner peripheral surface of the cylinder tube in order to prevent the magnetic particles within the MRF from flowing out when the piston rod slides in the MRF damper, there is a possibility that the magnetic particles enter irregular portions of the surface of the piston rod and flow out passing through the sealing member when the surface roughness of the piston rod is coarse (i.e., the surface roughness is large).

Then, as a technology of solving such problem, U.S. Pat. No. 6,516,926 has disclosed a technology of providing a Cr plating film on an outer peripheral surface of the piston rod and of polishing and smoothing the surface as a perfectly circular surface by using a tape polishing method or the like.

The cylinder tube contacts with the piston in the MRF damper in a manner of metal-to-metal contact in general and a clearance between the cylinder tube and the piston is required to be very accurate. However, because the Cr plating is electroplating (electrolytic plating), it is difficult to uniformize a thickness of the Cr plating film by controlling Cr plating conditions. The thickness tends to vary even more in forming the Cr plating film on the inner peripheral surface of the cylinder tube. Therefore, the Cr plating film is formed into a thickness fully larger than a thickness that is originally required for the Cr plating and then the Cr plating film is ground and polished to a desirable thickness by way of honing or the like to meet with the required precision of the above-mentioned clearance.

When a cylinder tube having a Cr plating film 40 μm thick on its inner peripheral surface is to be manufactured for example, the Cr plating film is formed by Cr plating so that its maximum thickness becomes about 100 μm on the inner peripheral surface of the cylinder tube and then the thickness is adjusted to 40 μm by grinding and polishing such as honing. However, such manufacturing method has problems that productivity drops because it requires a long treatment time for the Cr plating and a certain processing time for grinding and polishing, e.g., honing, the film and that it is costly due to the costs required for the Cr plating and for grinding and polishing, e.g., honing, the film.

In a case of forming a Cr plating film on the piston rod, it is also required to perform a rounding process while reducing surface roughness by polishing the Cr plating film by using a polishing tape or the like after forming the Cr plating film that is fully thicker than a desired thickness by Cr plating in the same manner with the case of the cylinder tube. Accordingly, such manufacturing method of the piston rod has problems that it is costly due to polishing and that productivity drops because it requires a long polishing time.

Still more, a circumstance in which the MRF damper is driven while being biased by a side force for example occurs frequently in a vehicle or the like using the MRF damper. Under such circumstance, there is a problem in terms of durability that abrasion is accelerated because the fluorine resin impregnated layer of the metal bush is soft. Still more, because the magnetic particles contained in the MRF are very small, the magnetic particles infiltrate into the gap between the piston rod and the rod guide when the fluorine resin impregnated layer of the metal bush abrades away and accelerate the abrasion of the fluorine resin impregnated layer further.

Then, as a method for solving such problems, it is conceivable to use a material obtained by impregnating fluorine resin such as tetrafluoroethylene to hard alumite (referred to as "fluorine resin contained hard alumite" hereinafter) on the sliding surface of the rod guide. The fluorine resin contained hard alumite excels in abrasion resistance because it is harder than the fluorine resin impregnated layer of the metal bush and has characteristics that its sliding resistance is small as compared to the hard alumite because it contains the fluorine resin.

However, the inventors found that the fluorine resin contained hard alumite has a problem that it indicates a relatively large sliding resistance value in a state being pressed by a large force. Therefore, the MRF damper structured by using the rod guide having the fluorine resin contained hard alumite on its sliding surface that slides relative to the piston rod has a possibility of dropping accuracy in outputting a target damping force if the MRF damper is biased by the side force or the like when a driving signal (specifically, this indicates magnitude of an electric current flown to the electromagnetic coil and is referred to as an "input signal" hereinafter) is inputted to the MRF damper to obtain a desirable damping force because the sliding resistance between the piston rod and the rod guide increases. Still more, the increase of the sliding resistance between the piston rod and the rod guide tends to advance the abrasion of the sliding surfaces of the piston rod and the rod guide. It further causes various problems that drop the durability of the damper by causing a rickety piston rod supporting state, a leak of the MRF and the like.

The present invention has been made in view of the problems described above and seeks to provide a variable damping-force damper that is capable of suppressing the drop of operational accuracy in the state being biased by the side force or the like and has excellent durability as well as to provide a manufacturing method of the same with high productivity and at low cost.

SUMMARY OF THE INVENTION

A variable damping-force damper of the invention includes:

a cylinder tube filled with a working fluid that is a magnetic fluid or a magneto-rheological fluid containing magnetic particles; and a piston that partitions an inside of the cylinder tube into first and second chambers, has a communication hole for circulating the work fluid between the first and second chambers and has an electromagnetic coil for applying a magnetic field to the work fluid within the communication hole;

the variable damping-force damper controlling a damping force by changing viscosity of the work fluid within the communication hole by feeding power to the electromagnetic coil;

wherein the variable damping-force damper has a sliding surface that slides under an influence of the magnetic particles during its telescopic motion; and the sliding surface has a nickel plating film whose Vickers hardness is 800 VHN or more on the surface thereof.

Such Ni plating film whose Vickers hardness is 800 VHN or more may be formed by implementing electroless nickel plating on the sliding surface and by treating the Ni plating film formed by the electroless nickel plating by heat for 0.5 to 5 hours at 200° C. to 600° C.

According to the variable damping-force damper of the invention, the hardness of the Ni plating film formed on the sliding surface is equalized with that of the Cr plating film of the prior art, so that the Ni plating film shows excellent durability. Still more, because it is possible to form the Ni plating film having a desirable precise thickness (measurement precision) in an electroless Ni plating step, it is not necessary to carry out grinding and polishing such as honing. Accordingly, it is also possible to obtain high productivity.

According to the variable damping-force damper of the invention, preferably the Ni plating film contains phosphorus as well as one or plurality of elements selected from boron, tungsten, boron nitride and silicon carbide. The phosphorus, boron and tungsten are contained in the Ni plating film by chemically bonding with nickel and the boron nitride and silicon carbide are dispersed and contained in the Ni plating film. The boron, tungsten, boron nitride and silicon carbide may be contained in the Ni plating film by codepositing respectively with nickel.

By constructing as described above, it becomes possible to reduce a coefficient of friction of the Ni plating film and to adjust to a desirable coefficient of friction. Thereby, it becomes possible to adjust abrasion resistance of the Ni plating film itself and to control its aggression against a sliding mating material. Still more, it becomes possible to obtain excellent durability (abrasion resistance) by hardening the Ni plating film.

In the variable damping-force damper of the invention, the sliding surface is an outer peripheral surface of the piston or an inner peripheral surface of the cylinder tube and preferably, the Ni plating film is provided at least on the inner peripheral surface of the cylinder tube. In this case, preferably, a thickness of the Ni plating film is 15 μm or more when a length of sliding portion of the piston in an axial core direction is 50 mm and when the length of the sliding portion is shorter than 50 mm, the thickness of the Ni plating film is set such that the shorter the length of the sliding portion, the thicker the thickness of the Ni plating film becomes beyond 15 μm.

It becomes possible to arrange so that elapsed abrasion of the Ni plating film formed on the inner peripheral surface of the cylinder tube does not depend on the length of the sliding portion of the piston that slides relative to the Ni plating film in the axial core direction by constructing as described above.

The variable damping-force damper of the invention further includes a piston rod whose one end is attached to the piston and whose other end extends to the outside of the cylinder tube. The cylinder tube has a cylindrical rod guide section disposed at one end thereof so that the piston rod is inserted through the rod guide. In this case, the sliding surface is an interfacial sliding surface of the inner peripheral surface of the rod guide and the outer peripheral surface of the piston rod and the Ni plating film is preferably provided at least on the outer peripheral surface of the piston rod.

Because it is possible not only to suppress the abrasion of the piston rod but also to reduce the surface roughness of the outer peripheral surface of the piston rod by forming the Ni plating film by means of electroless nickel plating on the outer peripheral surface of the piston rod as described above, it is also possible to prevent the magnetic particles from otherwise leaking out of the cylinder tube due to the irregularity of the outer peripheral surface of the piston rod and to improve the durability thereof.

The variable damping-force damper of the invention includes a cylinder tube in which a working fluid containing magnetic particles is filled, a piston slidably disposed within the cylinder tube, a piston rod disposed such that one end thereof is attached to the piston and another end protrudes out of one end of the cylinder tube and a rod guide that closes one end of the cylinder tube and slidably supports the piston rod, wherein the rod guide has a heat-treated electroless Ni plating film containing phosphorus and fluorite resin on the sliding surface that slides relative to the piston rod.

The rod guide is manufactured through a process including an electroless nickel plating step of forming the electroless Ni plating film containing phosphorus and fluorine resin on a surface that slides relative to the piston rod in the predetermined base material portion composing the rod guide and a heat treatment step of implementing a heat treatment on the electroless Ni plating film formed by the electroless nickel plating step. It is noted that the electroless Ni plating film containing the phosphorus and fluorine resin may be formed by using a plating solution in which the fluorine resin is doped in an electroless Ni plating solution utilizing a reducing effect of hypophosphorus and the phosphorus and fluorine resin codeposit in precipitating nickel.

The variable damping-force damper of the invention reduces sliding resistance between the piston rod and the rod guide by reducing the coefficient of friction of the sliding surface of the rod guide by the electroless Ni plating film containing the fluorine resin, so that it becomes possible to reduce a drop of the operational accuracy of the damper with respect to an input signal even in a state biased by a side force or the like.

Preferably, the Vickers hardness of the electroless Ni plating film plated on the rod guide is 360 VHN or more in the variable damping-force damper of the invention. In other words, a treatment condition of the heat treatment step of the electroless Ni plating film is set such that the Vickers hardness of the electroless Ni plating film becomes 360 VHN or more. It allows the abrasion resistance of the rod guide to be improved.

Preferably, the variable damping-force damper of the invention is arranged such that the rod guide has a base material portion made of aluminum or aluminum alloy (referred to as the "Aluminum alloy or the like" hereinafter), the electroless Ni plating film is formed on a predetermined surface of the base material portion and the piston rod slides relative to the electroless Ni plating film.

When the variable damping-force damper is driven while being biased by the side force or the like, its stress may be relaxed because the rod guide (base material portion) that receives the stress from the piston rod slightly elastically deforms when the aluminum alloy or the like is used for the base material portion of the rod guide as described above. It is also possible to suppress an increase of the sliding resistance between the piston rod and the rod guide because a face-to-face contact state of the piston rod and the rod guide is maintained. Thus, it becomes possible to keep the drop of the operational accuracy of the variable damping-force damper with respect to an input signal low and to suppress frictional abrasion of the both sliding surfaces of the piston rod and the rod guide (specifically, occurrence of biased abrasion caused by locally increased friction). Note that because the aluminum alloy or the like is inexpensive and excels in workability, it has merits that the rod guide that excels in accuracy of form may be manufactured at low cost with high productivity.

Preferably, the aluminum alloy is used for the base material portion of the rod guide in the variable damping-force damper of the invention and in that case, preferably the base material portion is formed in a state in which the alloy ingredients other than Al (referred to as "alloy ingredients" hereinafter) precipitate. It becomes easy to obtain well-balanced mechanical characteristics such as hardness, yield point, tensile strength and others desired as a structural part by using the aluminum alloy for the base material portion of the rod guide. When the base material portion is in the state in which the alloy ingredients precipitate, it becomes possible to suppress various metal atoms composing the aluminum alloy from moving due to dislocation and to keep the mechanical characteristics. Meanwhile because the electroless nickel plating film is treated by heat so that it has the predetermined Vickers hardness as described above, it is preferable to balance the composition and others of the aluminum alloy with the heat treatment conditions so that the precipitation state of the alloy ingredients in the aluminum alloy does not change as much as possible by this heat treatment. Still more, it is preferable to arrange so that the alloy ingredients precipitated in the aluminum alloy do not fall into a state in which they become solid-soluble to Al by the heat treatment step of the electroless Ni plating film.

In the variable damping-force damper of the invention, preferably the electroless Ni plating film has a two-layered structure of a first electroless Ni plating layer formed on the surface of the base material portion and containing phosphorus and of a second electroless Ni plating layer formed on the surface of the first electroless Ni plating layer and containing phosphorus and fluorine resin and preferably, the first electroless Ni plating layer has hardness that is harder than that of the second electroless Ni plating layer.

It becomes possible to reduce the sliding resistance between the piston rod and the rod guide because the second electroless nickel plating layer slides relative to the rod guide in an initial period of usage of the variable damping-force damper. When the second electroless nickel plating layer abrades with time, the sliding resistance decreases because the clearance between the piston rod and the rod guide is widened. At this time, the first electroless nickel plating layer that has the hardness harder than the second electroless nickel plating layer slides relative to the rod guide, so that the first plating layer can suppress the advance of abrasion of the first electroless nickel plating layer. Thus, it becomes possible to keep the excellent durability.

Preferably, the rod guide is provided with a sealing member to prevent the working fluid from leaking out of the cylinder tube in the variable damping-force damper of the invention. It is also preferable to provide the sealing member on the side closer to the piston rather than the electroless Ni plating film in the axial core direction of the cylinder tube. Thereby, the sealing member can reduce a number of the magnetic particles entering the sliding surface between the rod guide and the piston rod and can suppress the abrasion of the both sliding surfaces of the rod guide and the piston rod.

Preferably, the piston rod is provided with an electroless Ni plating film or a Cr plating film on the sliding surface thereof with a thickness of 10 μm or more and a surface roughness of 0.1 to 1.5 in terms of a Rz value. It becomes possible to reduce the magnetic particles entering the gap between the piston rod and the rod guide and to suppress the abrasion of the sliding surface by smoothing the surface of the piston rod.

As described above, according to the present invention, it is possible to obtain the excellent abrasion resistance and to reduce the abrasion by forming the highly hard Ni plating film on the sliding surface that slides under influence of the magnetic particles. Thereby, it becomes possible to improve the durability of the variable damping-force damper and to keep its damping for constant for a long period of time. Still more, because the plating process that is implemented on the predetermined sliding surface may be accomplished only by the electroless nickel plating, it becomes possible to simplify the plating process and to reduce costs required for the plating process. Further, because the Ni plating film having a desirable precision may be formed only by the electroless nickel plating, it becomes unnecessary to carry out grinding and polishing such as honing to adjust dimensions when the Ni plating film is formed on the cylinder tube for example. Thus, the production cost may be lowered further. It is also possible to suppress the magnetic particles from being discharged out of the cylinder tube and to improve the durability by forming the Ni plating film on the outer peripheral surface of the piston rod to reduce its surface roughness.

The variable damping-force damper of the invention is also provided with the electroless Ni plating film in which fluorine resin is codeposited and whose coefficient of friction is small on the sliding surface of the rod guide that slides relative to the piston rod, so that it is possible to suppress an increase of the sliding resistance between the rod guide and the piston rod even when the piston rod is biased by the side force or the like and hence to suppress the abrasion of the both sliding surfaces of the rod guide and the piston rod. Still more, the use of the aluminum alloy or the like for the base material portion of the rod guide allows to suppress an increase of the sliding resistance between the rod guide and the piston rod when the piston rod presses the rod guide due to the biased force such as the side force because the aluminum alloy or the like relaxes the stress by its elastic deformation.

BRIEF DESCRIPTION OF DRAWINGS

FIG. 11 is a graph showing changes of an inner diameter of a cylinder tube in an axial core direction after a durability test of the variable damping-force damper of the first embodiment;

BEST MODE FOR CARRYING OUT THE INVENTION

A mode for carrying out the invention will be explained in detail below with reference to the drawings. Firstly, an overall structure of a variable damping-force damper will be explained.

Figure 1:
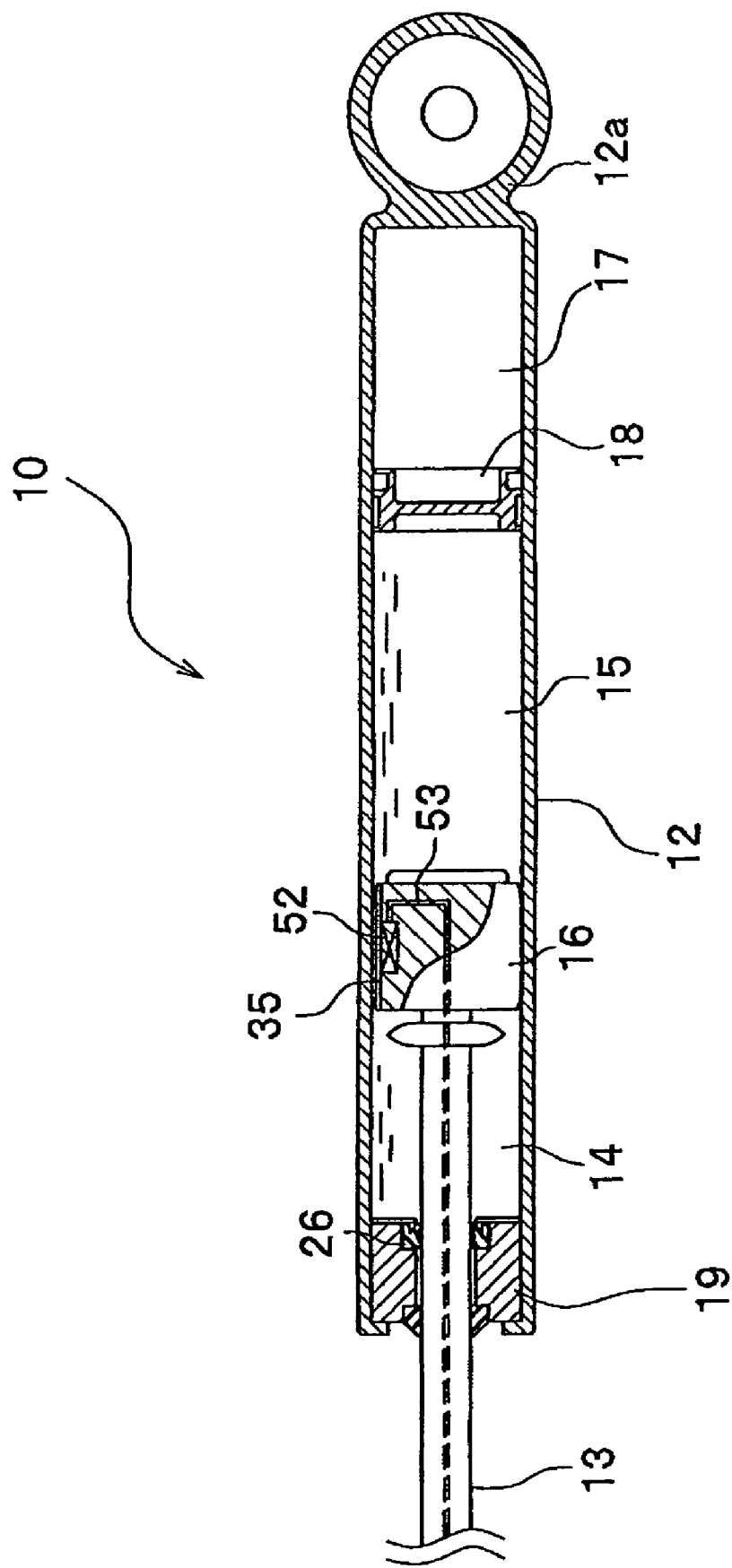
FIG. 1 is a section view showing a schematic structure of a variable damping-force damper according to a first embodiment of the invention.

FIG. 1 is a section view showing a schematic structure of the variable damping-force damper according to one embodiment of the invention.

The variable damping-force damper 10 has a so-called mono-tube (de-carvone type) structure and has a cylindrical cylinder tube 12 filled with MRF (magnetic fluid or magneto-rheological fluid) in which magnetic particles are dispersed in oil and the like, a piston rod 13 slidable in an axial core direction (longitudinal direction) of the cylinder tube 12, a piston 16 attached at an edge of the piston rod 13 to partition an inside of the cylinder tube 12 into a first oil chamber (first chamber) 14 and a second oil chamber (second chamber) 15 and a free piston 18 that partitions a high pressure gas chamber 17 from the second oil chamber 15.

A rod guide 19 is provided at one end of the cylinder tube 12 to close an opening of the cylinder tube 12. Substantially, the rod guide 19 has a cylindrical shape and supports the piston rod 13 that is inserted through a center hole of the rod guide 19. Then, an outer peripheral surface of the piston rod 13 (a sliding surface of the piston rod 13) slides with an inner peripheral surface of the rod guide 19 (a sliding surface of the rod guide 19). The rod guide 19 is also provided with a packing 26 for preventing the MRF from leaking to an outside of the piston. The structures of the piston rod 13 and the rod guide 19 will be detailed later, respectively.

An eyepiece 12a is provided at the other end of the cylinder tube 12. When the variable damping-force damper 10 is used as a suspension of a vehicle for example, a bolt not shown is inserted through the cylinder tube 12a and is linked with a trailing arm, a wheel-side member. Another end (not shown) of the piston rod 13 is linked with a damper base (upper part of a wheel house) that is a body-side member. Vibration transmitted from the wheel side to the body side during traveling is damped by the cylinder in which the outer peripheral surfaces of the piston 16 and the free piston 18 slide relative to the inner peripheral surface of the cylinder tube 12.

The piston 16 has a communication hole 35 that communicates the first oil chamber 14 with the second oil chamber 15 and an electromagnetic coil 52 that applies a magnetic field to the MRF within the communication hole 35. Electric current is supplied to the magnetic coil 52 by using a 53 connected with the magnetic coil 52. The power feeding line 53 is taken out of the outside (its state is not shown) of the cylinder through an inside of the piston rod 13 and is connected with a predetermined control power source not shown. When the electric current is supplied from the control power source to the magnetic coil 52 through the power feeding line 53, a magnetic field is applied to the MRF circulating through the communication hole 35, the magnetic particles contained in the MRF form chain clusters and apparent viscosity of the MRF passing through the communication hole 35 increases. Thus, it is possible to control damping force variably by controlling magnitude of the magnetic field applied to the MRF.

Next, the structure of the piston 16 will be explained.

Figure 2:
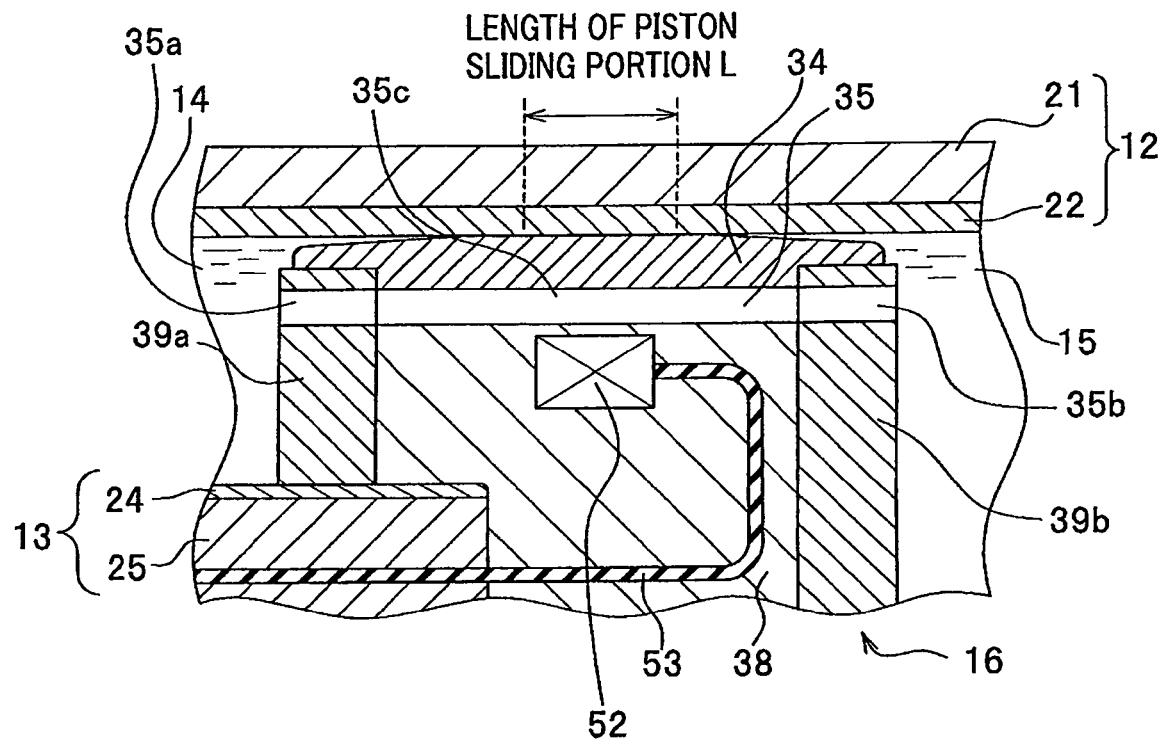
FIG. 2 is a partially enlarged section view of a piston composing the variable damping-force damper of the invention.

FIG. 2 is a partially enlarged section view of the piston composing the variable damping-force damper. The piston 16 has a piston core 38 that fits with the piston rod 13, side covers 39a and 39b provided respectively at ends of the piston core 38 in an axial direction, the magnetic coil 52 embedded in the piston core 38 near an outer circumference of the piston core 38 and a cylindrical piston ring 34 surrounding the piston core 38 so that a certain gap 35c is formed between the piston ring 34 and the outer circumference of the piston core 38.

The side covers 39a and 39b are provided with holes 35a and 35b and the communication hole 35 is composed of the holes 35a and 35b and the gap 35c that communicate from each other in the piston 16. The first oil chamber 14 communicates with the second oil chamber 15 through the communication hole 35 and the MRF circulates through the communication hole 35. Specifically, when the electric current is supplied from the control power source (not shown) to the magnetic coil 52 through the power feeding line 53, the magnetic field is applied to the MRF circulating through the communication hole 35c, the ferromagnetic particles contained in the MRF form chain clusters and the apparent viscosity of the MRF passing through the communication hole 35c increases. Thus, it is possible to control the damping force variably by controlling the magnitude of the magnetic field applied to the MRF as described above.

The piston ring 34 has a cylindrical shape and its both ends are tightly sealed to the side covers 39a and 39b by way of caulking and the like. As shown in FIG. 2, an outer diameter of the piston ring 34 is not constant along the axial direction. That is, although the outer diameter is constant within a certain length range at a center part of the ring along the axial direction, the outer diameter becomes short as it goes to the end. The portion where the outer diameter is constant is a sliding portion that substantially slides relative to the inner peripheral surface of the cylinder tube 12. A length of the sliding portion in the axial direction is denoted as "L" and will be referred to as a "length of the piston sliding portion L" hereinafter. It is noted that the length of piston sliding portion L is a parameter related to a thickness of a Ni plating film 22 (described later) formed on the inner peripheral surface of the cylinder tube 12 and this relationship will be also detailed later.

Next, the structure of the cylinder tube 12 and a manufacturing method of the same will be explained. As shown in FIG. 2, the cylinder tube 12 has a structure in which the Ni plating film 22 is formed on an inner peripheral surface of a cylinder base material 21 made from metal such as iron and stainless steel. The piston 16 and the free piston 18 (see FIG. 1) slide relative to the Ni plating film 22. The Ni plating film 22 is crystal and its Vickers hardness is 800 VHN or more. Because the highly hard Ni plating film 22 has thus excellent abrasion resistance, it is possible to suppress elapsed abrasion of the inner peripheral surface of the cylinder tube 12 and to maintain a damping force of the variable damping-force damper 10 at constant for a long period of time.

It is possible to form the Ni plating film 22 by applying electroless Ni plating on the inner peripheral surface of the cylinder tube 12 and by treating the Ni plating film thus formed by heat at 200° C. to 600° C. for 0.5 to 5 hours. It is noted that the Ni plating film 22 may be formed also on the outer peripheral surface of the cylinder tube 12. Although the Ni plating film (before the heat treatment) formed by the electroless Ni plating is amorphous, the Ni plating film is crystallized by the heat treatment. It happens because although phosphorus (P) is generally contained in the Ni plating film (before the heat treatment) formed by the electroless Ni plating due to a process of a chemical reaction of the electroless Ni plating, the heat treatment causes a chemical reaction of Ni and P, forming a crystal phase of $Ni_3P$.

Because it is necessary to contact the cylinder tube 12 and the piston 16 in a manner of metal-to-metal contact in the variable damping-force damper 10, a high precision, i.e., specifically a value around 50 μm, is required for a difference between an inner radium of the cylinder tube 12 and an outer radius of the piston 16 at the sliding portion, i.e., for a clearance between the cylinder tube 12 and the piston 16 (referred to simply as a "clearance" hereinafter).

As concrete examples, Table 1 shows characteristics of a Ni plating film containing no those additional ingredients and Ni plating films 22 containing respectively W, BN and SiC together with the Cr plating film (prior art example) with respect to Vickers hardness and frictional characteristics. Although the Ni—P plating film containing no additional ingredient has characteristics that its coefficient of friction is larger than that of the Cr plating film, it has a merit that its mate aggression is low because its Vickers hardness is small as shown in results of a durability test described later even though Table 1 does not show that.

TABLE 1

| CLASSIFICATION | PRIOR ART | | PRESENT INVENTION | | |
|---|---|---|---|---|---|
| PLATING | ELECTRO-PLATING | | ELECTROLESS-PLATING | | |
| PLATING FILM | HARD Cr | Ni—P | Ni—P—W | Ni—P; BN | Ni—P + SiC |
| VICKERS' HARDNESS | 900 to 1000 | 800 to 900 | 900 to 1000 | 1000 to 1100 | 1300 to 1400 |
| COEFFICIENT OF FRICTION (COEFFICIENT OF DYNAMIC FRICTION) | 0.6 | 0.8 | 0.6 | 0.6 | 0.72 |
| PIN ABRASION (mg) (AGGRESSION AGAINST SLIDING MEMBER) | 2.79 | — | 0.87 | 0/06 | 3.5 |

NOTE:
The coefficient of friction is a value with respect to SUJ steel (bearing steel) and the PIN abrasion is that of the SUJ steel.

It is possible to grow the Ni plating film 22 to a desirable thickness while readily controlling an uniformity of thickness of the Ni plating film 22 in a level of ±2 to 3 μm by the electroless Ni plating. Because the precision of the uniformity of the thickness required to the Ni plating film 22 can be realized in the process of the electroless Ni plating, it is possible to realize a precision required also to the clearance. Accordingly, it is possible to reduce a machining cost and thus a production cost because it is not necessary to adjust the thickness of the Ni plating film 22 by conducting grinding and polishing processes such as honing in a manufacturing process of the cylinder tube 12 or of the variable damping-force damper 10. Still more, it is possible to cut a cost regarding the plating process because Cr plating that has been required in the past is not necessary and the plating process may be simplified. It is noted that grinding and polishing such as honing may be carried out on the Ni plating film 22.

Next, composition and frictional characteristics of the Ni plating film 22 will be explained. Preferably, the Ni plating film 22 contains phosphorus (P) as described above. P may be codeposited with Ni by using hypophosphorus ($H_3PO_2$) that is a general reducing agent used in electroless Ni plating. Preferably, the Ni plating film 22 further contains one or plurality of elements selected from boron (B), tungsten (W), boron nitride (BN) and silicon carbide (SiC) (referred to as "additional ingredients" hereinafter). B and W exist within the Ni plating film 22 with a form chemically bonded with Ni (described as "Ni—P—W" and "Ni—P—B" hereinafter). Meanwhile, BN and SiC are dispersed within the Ni plating film 22 and compose a metal-ceramics compound material (described as "Ni—P+BN" and "Ni—P+SiC" hereinafter). B, W, BN and SiC may be contained respectively in the Ni plating film 22 by eutectoid from a plating solution.

It is noted that the additional ingredients to the Ni plating film 22 are not limited the various elements (metals) and chemical compounds described above. It is also possible to use boron carbide ($B_4C$), silicon nitride ($Si_3N_4$), alumina ($Al_2O_3$), zirconia ($ZrO_2$), aluminum nitride (AlN), diamond (C) or the like for example.

It is possible to adjust the coefficient of friction of the Ni plating film 22 to a desirable value within a certain range depending on material properties of the additional ingredients described above by appropriately selecting the additional ingredients and controlling an added amount. As shown in Table 1, the coefficient of friction of the respective plating films of Ni—P—W, Ni—P+BN and Ni—P+SiC is smaller than that of the Ni—P plating film. It can be seen from this fact that W, BN and SiC have an effect of reducing the coefficient of friction of the Ni plating film 22. The reduction of the coefficient of friction of the Ni plating film 22 allows the aggression of the Ni plating film 22 ageist the sliding surface of the piston 16 (the sliding surface of the piston ring 34) to be lowered and thereby the abrasion of the sliding surface of the piston 16 to be reduced.

The Vickers hardness of the Ni plating film 22 may be adjusted to a desirable value within a certain range depending on material properties of the additional ingredients described above by appropriately selecting the additional ingredients and controlling their added amount. The Vickers hardness of the respective plating films of Ni—P—W, Ni—P+BN and Ni—P+SiC is larger than that of the Ni—P plating film as shown in Table 1. That is, it can be seen from the above that W, BN and SiC have an effect of increasing the Vickers hardness of the Ni plating film 22. Such effect may be obtained in the same manner also when B, $B_4C$ and $Si_3N_4$ are used as additional ingredients. It becomes possible to improve abrasion resistance of the Ni plating film 22 itself by enhancing the Vickers hardness of the Ni plating film 22. In contrary to that, it is hard to form a Cr plating film whose Vickers hardness exceeds 1000 VHN by Cr plating.

As shown in Table 1, although the Ni—P—W plating film has characteristics that its Vickers hardness and coefficient of friction are equal to those of the Cr plating film, it has merits that its PIN abrasion is small and mate aggression is low. Although the Ni—P—B plating film has characteristics that its Vickers hardness is slightly larger than that of the Cr plating film and its coefficient of friction is equal to that of the Cr plating film, its PIN abrasion is small and mate aggression is low. In the case of the Ni—P—SiC plating film, its Vickers hardness larger than that of the Cr plating film and its coefficient of friction is slightly larger than that of the Cr plating film. It can be seen that the PIN abrasion of the Ni—P—SiC plating film is larger than that of the Cr plating film and that its mate aggression is enhanced. The Ni—P—SiC plating film is used not from an aspect of lowering the mate aggression but from an aspect of that the Ni—P—SiC plating film itself shows excellent abrasion resistance. When the Ni—P—SiC plating film is used as the Ni plating film 22, it is preferable to select a material whose abrasion becomes small as the piston ring 34 when it slides relative to the Ni—P—SiC plating film.

It is preferable to adjust the coefficient of friction and the Vickers hardness of the Ni plating film 22 by considering the material property of the piston ring 34 so that frictional balance between the cylinder tube 12 and the piston 16 is improved, e.g., so that total abrasion of the sliding portions of the Ni plating film 22 and the piston 16 is minimized. Thereby, it becomes possible to obtain the variable damping-force damper 10 having excellent durability. Still more, it becomes possible to keep the damping force of the variable damping-force damper 10 constant for a long period of time by reducing the total abrasion of the sliding portions of the Ni plating film 22 and the piston 16.

Next, implications between the thickness of the Ni plating film 22 and the length of the piston sliding portion L of the piston will be explained.

The thickness of the Ni plating film 22 is a factor that determines the durability (life) of the variable damping-force damper 10. The durability improves if the thickness of the Ni plating film 22 is increased. However, if the thickness of the Ni plating film 22 is increased more than what is required, it drops productivity and increases a production cost. Therefore, it is preferable to appropriately determine the thickness of the Ni plating film 22 (least required thickness) considered as adequate from aspects of durability and productivity by considering use environment.

The thickness of the Ni plating film 22 is preferable to be 15 μm or more when a length of the piston sliding portion L with respect to the Ni plating film 22 is 50 mm in the variable damping-force damper 10. When the length of the piston sliding portion L is shorter than 50 mm, it is preferable to set the thickness of the Ni plating film 22 so that the shorter the length of the piston sliding portion L, the thicker the thickness of the Ni plating film 22 becomes beyond 15 μm. The variable damping-force damper 10 described above may be suitably used for a suspension of a vehicle.

Note that "the shorter the length of the piston sliding portion L, the thicker the thickness of the Ni plating film 22 becomes beyond 15 μm" described above in setting the thickness of the Ni plating film 22 indicates specifically that "the thickness of the Ni plating film 22 is increased so that it becomes inversely proportional to a square root of the length of the piston sliding portion L." A reason why the length of the piston sliding portion L is set as 50 mm and the thickness of the Ni plating film 22 as 15 μm as reference values will be explained in embodiments described later.

If the thickness of the Ni plating film 22 is under 15 μm when the length of the piston sliding portion L is 50 mm, a time until when the base of the cylinder tube 12 appears due to the abrasion of the Ni plating film 22 becomes short and enough durability cannot be obtained. An upper limit value of the thickness of the Ni plating film 22 may be defined in terms of a safety factor, productivity and a production cost and is from 20 μm to 30 μm.

The thickness of the Ni plating film 22 is changed in accordance to the length of the piston sliding portion L because the thickness required for the Ni plating film 22 changes depending on a surface pressure between the sliding surface of the piston 16 and the Ni plating film 22 (simply referred to as the "surface pressure" hereinafter). When an external force (side force) of predetermined magnitude acts in a radial direction of the piston 16 for example and if the length of the piston sliding portion L is short, a contact area of the piston 16 and the Ni plating film 22 decreases and the surface pressure increases. The shorter the length of the piston sliding portion L, the harder a frictional environment between the piston 16 and the cylinder tube 12 becomes, increasing abrasion of the Ni plating film 22. Therefore, it is preferable to increase the thickness of the Ni plating film 22 as the length of the piston sliding portion L is shortened so that the plurality of kinds of variable damping-force dampers 10 having different piston sliding portion lengths L may have a constant product life.

A concrete relationship between The length of the piston sliding portion L and the thickness of the Ni plating film 22 when the length of the piston sliding portion L is under 50 mm may be found based on abrasion of the Ni plating film 22 in a durability test using a piston 16 having a predetermined length of the piston sliding portion L, a surface pressure in the durability test and an elastic contact theory, e.g., Hertz Elastic Contact Theory. This method will be briefly explained below.

The following is an outline of the durability test carried out here.

Figure 3:
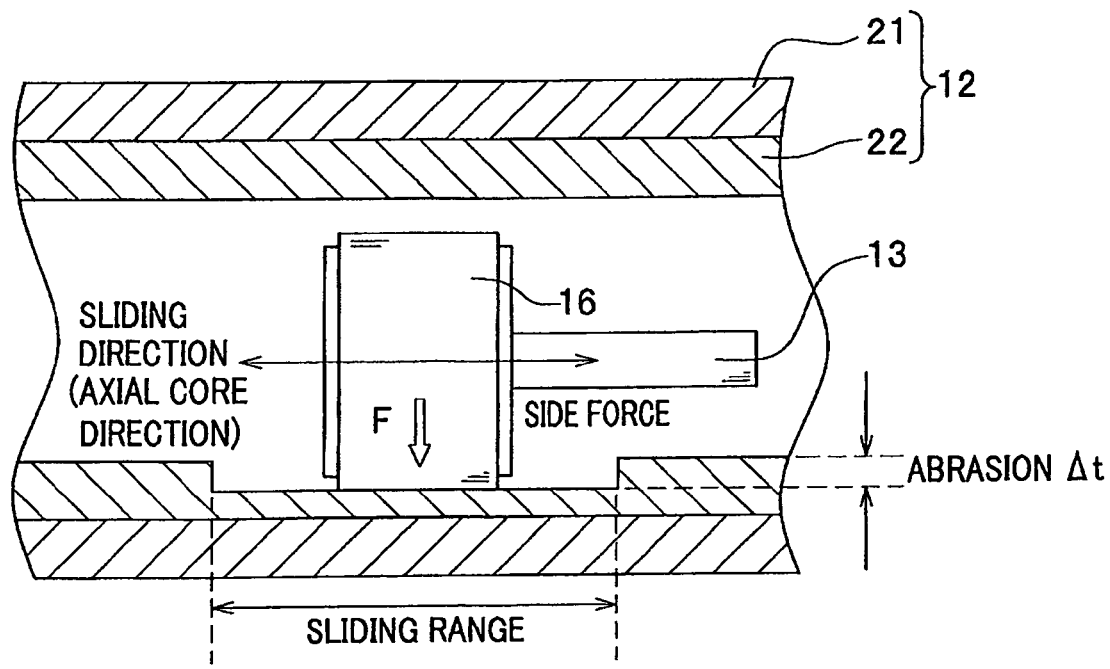
FIG. 3 is a section view diagrammatically showing a method for carrying out a durability test.
Figure 4:
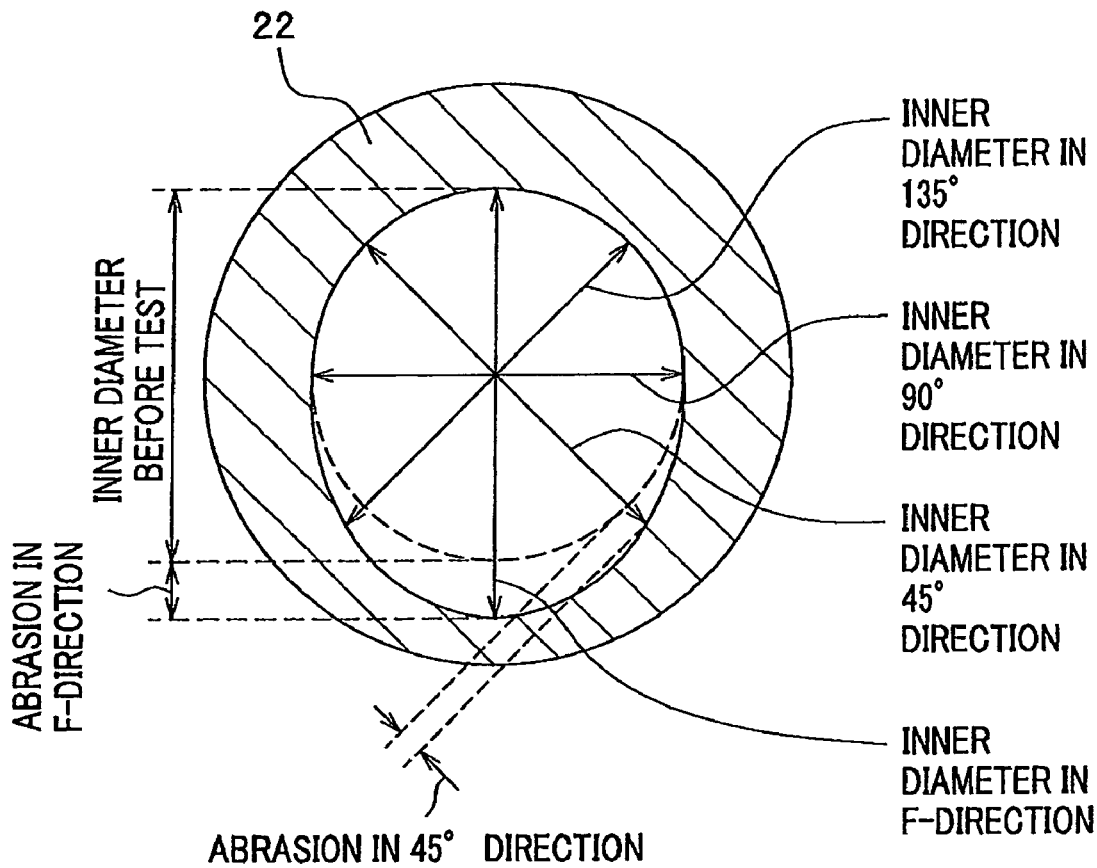
FIG. 4 diagrammatically shows a method for measuring abrasion caused in the durability test.

FIG. 3 is a section view diagrammatically showing a method for carrying out the durability test and FIG. 4 diagrammatically shows a method for measuring abrasion caused in the durability test. The durability test is carried to find the abrasion (abraded thickness) $\Delta t$ of the Ni plating film 22 by reciprocating the sliding portion of the piston 16 within a certain length range (referred to as a "piston sliding range" hereinafter) in the axial core direction in the cylinder tube 12 while applying a certain force (side force) F in the radial direction (in the vertically lower direction here) of the piston 16 and by measuring changes of the inner diameter of the cylinder tube 12 as shown in FIG. 3.

Before starting the durability test, dependency of the inner diameter in the axial core direction remains within a tolerance and it can be said that there is substantially no such dependency. However, after ending the durability test, biased abrasion occurs on the inner peripheral surface of the cylinder tube 12 by the side force F and the abrasion $\Delta t$ differs depending on the radial direction. Then, in order to correlate the abrasion $\Delta t$ of the Ni plating film 22 with the direction of the side force F, the inner diameter of the cylinder tube 12 in the direction of the side force F is defined as a "F-direction inner diameter" and the inner diameters of the cylinder tube 12 in the radial direction crossing respectively with the direction of the side force F at 45°, 90° and 135° are defined as "inner diameter in 45° direction," "inner diameter in 90° direction" and "inner direction in 135° direction" as shown in FIG. 4 to measure the respective inner diameters at predetermined intervals in the axial core direction by using a commercially available cylinder gauge and the like. It enables one to find the abrasion $\Delta t$ of the Ni plating film 22 in each direction. Note that FIG. 4 specifically shows the abrasions in the F-direction and in the 45° direction.

Figure 5:
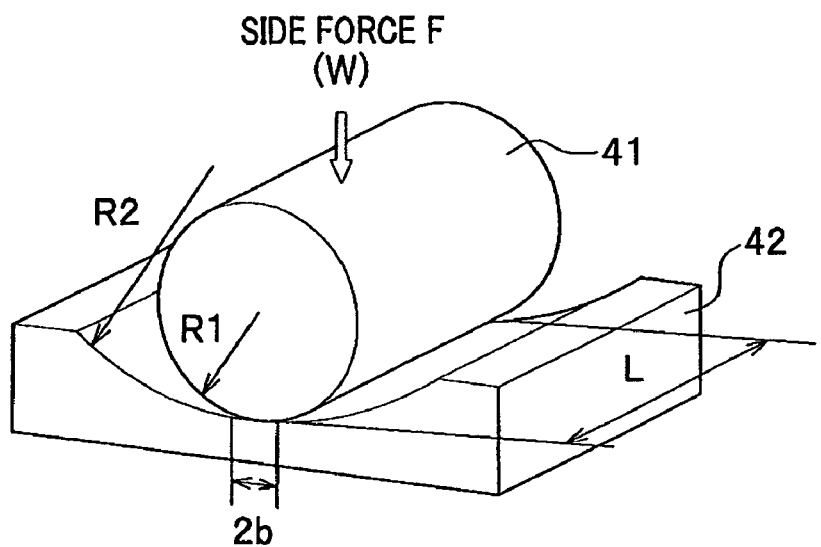
FIG. 5 is a perspective view diagrammatically showing a state of contact of a cylindrical member with a member having a concave curved surface.

A method for calculating the relationship between the thickness of the Ni plating film 22 and the length of the piston sliding portion L is carried out as follows. FIG. 5 is a perspective view diagrammatically showing a state of contact of a cylindrical member with a member having a concave curved surface. The cylindrical member 41 shown in FIG. 5 is regarded as the piston ring 34 and the concave curved member 42 as the Ni plating film 22, to find shapes and material properties of the piston ring 34 and the Ni plating film 22, a magnitude W of the side force F and a surface pressure PMEAN between the piston ring 34 and the Ni plating film 22.

Specifically, Young's modulus of the piston ring 34 having the length of the piston sliding portion L is denoted by E1, Poisson's ratio by v1 and an outer radius by R1 and Young's modulus of the Ni plating film 22 is denoted by E2, Poisson's ratio by v2 and an outer radius by R2. When the magnitude (weight) of the side force F is W, equivalent Young's modulus E may be given by Eq. 1, an equivalent radius of curvature R may be given by Eq. 2, a contact half-width b may be given by Eq. 3 and a contact area A may be given by Eq. 4, respectively, according to the Hertz's elastic contact theory. Then, a maximum hertz pressure PMAX may be given by Eq. 5 and a surface pressure (average hertz pressure) PMEAN may be given by Eq. 6.

It is possible to consider that the abrasion Δt of the Ni plating film 22 is primarily correlated with the surface pressure PMEAN. Then, Eq. 7 holds if its proportional constant is set as K. A relationship expressed by Eq. 8 holds between the abrasion Δt of the Ni plating film 22 and the length of the piston sliding portion L from Eqs. 1 through 7 and it can be seen that the abrasion Δt of the Ni plating film 22 is inversely proportional to a square root of the length of the piston sliding portion L. The abrasion Δt of the Ni plating film 22 is also the least minimum thickness required for the Ni plating film 22. Accordingly, the least minimum thickness of the Ni plating film 22 to be set when the length of the piston sliding portion L is changed may be found based on Eq. 8. It is noted that the least minimum thickness required for the Ni plating film 22 may be found by Eq. 8 also when the radius R1 of the piston ring 34 or the radius R2 of the Ni plating film 22 is changed (these changes are reflected in R) and when the materials of the piston ring 34 and the Ni plating film 22 are changed (these changes are reflected in E).

[Equations]

$$\frac{1}{E} = \frac{1}{2}\left[\frac{1-v_1^2}{E_1} + \frac{1-v_2^2}{E_2}\right] \quad \text{Eq. 1}$$

$$\frac{1}{R} = \frac{1}{R_1} - \frac{1}{R_2} \quad \text{Eq. 2}$$

$$b = \sqrt{\frac{8RW}{\pi EL}} \quad \text{Eq. 3}$$

$$A = 2bL \quad \text{Eq. 4}$$

$$P_{MAX} = \frac{2}{\pi}\frac{W}{bL} \quad \text{Eq. 5}$$

$$P_{MEAN} = \frac{\pi}{4}P_{MAX} \quad \text{Eq. 6}$$

$$\Delta t = K \cdot P_{MEAN} \quad \text{Eq. 7}$$

$$\Delta t = \frac{K}{4}\sqrt{\frac{\pi EW}{2RL}} \quad \text{Eq. 8}$$

A structure of the piston rod and the sliding portion with the rod guide section of the variable damping-force damper of the present embodiment will be explained below.

At first, the structure of the piston rod will be explained.

Figure 6A:
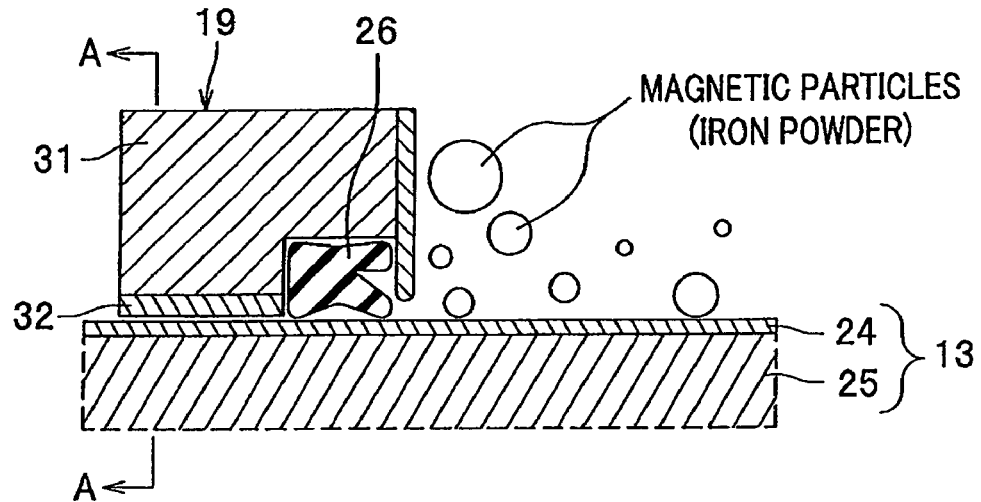
FIG. 6A is a perpendicular partial section view including an axial core of a piston rod diagrammatically showing a structure of the piston rod in a rod guide composing the variable damping-force damper of the embodiment and a sliding state of a rod guide section and the piston rod.

FIG. 6A is a perpendicular partial section view including the axial core of the piston rod 13 diagrammatically showing the structure of the piston rod 13 and the sliding portion between the rod guide section and the piston rod. FIG. 6C shows a reference example of the piston rod.

As shown in FIG. 6A, the piston rod 13 has a structure in which a Ni plating film 24 is formed on outer periphery of a rod base material 25 by means of electroless Ni plating. In the variable damping-force damper 10, a fluorine resin contained Ni plating film 32 containing fluorine resin described later formed on the rod guide 19 slides relative to the Ni plating film 24 formed on the piston rod 13.

When surface roughness of an outer peripheral surface of the rod is coarse as shown in FIG. 6C, small magnetic particles enter concave portions around the rod. If the rod slides to an atmosphere side (outside) in this state, the magnetic particles entered the concave portions are discharged to the atmosphere. That is, there is a problem that the concave portions around the rod act as a pump for discharging the magnetic particles (iron powder) and oil that composes the MRF together with the magnetic particles is also discharged. It also causes a problem that the magnetic particles abrade the inner peripheral surface of the rod guide 19.

In contrary to that, the outer peripheral surface of the piston rod 13 shown in FIG. 6A is formed so that its surface roughness is small and so the surface is highly smooth in forming the Ni plating film 24, so that it is possible to prevent the magnetic particles from discharging to the atmosphere. Still more, because it is possible to suppress the magnetic particles from infiltrating between the inner peripheral surface of the rod guide 19 and the outer peripheral surface of the piston rod 13, it is possible to suppress the inner peripheral surface of the rod guide 19 from being abraded.

When the size of the magnetic particles contained in the MRF is around 2 to 5 μm and precision (variation) of the thickness of the Ni plating film formed by means of the electroless Ni plating is ±10% for example, it is preferable to set the thickness of the Ni plating film 24 to be less than 20 μm in order to prevent the magnetic particles from being discharged to the atmosphere side (outside) through the sliding portion of the piston rod 13 and the rod guide 19.

It is noted that although no flowchart of a manufacturing method of the piston rod 13 will be shown, the piston rod 13 is manufactured through a step of fabricating the rod base material 25, an electroless Ni plating step and a heat treatment step in the same manner with the rod guide 19 described later. Here, an electroless Ni plating solution utilizing the reducing effect of the hypophosphorus is suitably used in the electroless Ni plating step. A method for forming the Ni plating film 24 is substantially the same with that of the Ni plating film 22 explained before. The heat treatment is carried out in the heat treatment step so that the Vickers hardness of the Ni plating film 24 becomes 800 VHN or more. It is possible to enhance productivity in manufacturing the piston rod 13 here because no polishing process such as tape polishing is required to form the outer circumstance thereof to be true circle and to reduce the surface roughness to smooth the surface.

A non-magnetic material such as aluminum alloy is suitably used as the rod base material 25. Preferably, the Ni plating film 24 has a thickness of 10 μm or more and surface roughness of 0.1 to 1.5 in terms of a Rz value (0.01 to 0.15 in terms of a Ra value). Because the electroless Ni plating step allows the Ni plating film 24 having the uniform thickness to be formed, it is not necessary to carry out the rounding process after the electroless Ni plating step in the manufacturing process of the piston rod 13. It is also possible to improve the abrasion resistance because the Ni plating film 24 may be hardened by the heat treatment. Still more, because the smooth surface having small surface roughness is formed by the electroless Ni plating step, it is not necessary to carry out any polishing. It is also possible to suppress the magnetic particles from infiltrating into the sliding surface between the rod guide 19 and the piston rod 13 that is otherwise caused by irregularity of the surface. Accordingly, using such piston rod 13 contributes a lot in the improvement of the durability of the rod guide 19.

It is noted that the hardness of the Ni plating film 24 is preferable to be 800 VHN or more in terms of the Vickers hardness. It allows very high abrasion resistance (durability) to be obtained. Still more, a chrome (Cr) plating film having the same nature and characteristics with the Ni plating film 24 may be formed in stead of the Ni plating film 24 on the piston rod 13. The Cr plating film may be formed by means of electrolytic plating. Because it is difficult to obtain the similar uniformity of thickness with that of the electroless Ni plating by the Cr plating, polishing is normally carried out to obtain a desirable thickness and surface roughness.

Next, the rod guide of the variable damping-force damper of the embodiment will be explained with reference to FIGS. 6A and 6B.

Figure 6B:
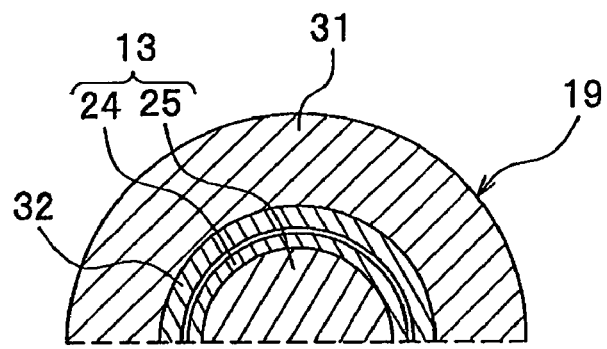
FIG. 6B is a section view of the rod guide composing the variable damping-force damper of the embodiment taken along A-A in FIG. 6A.
Figure 6C:
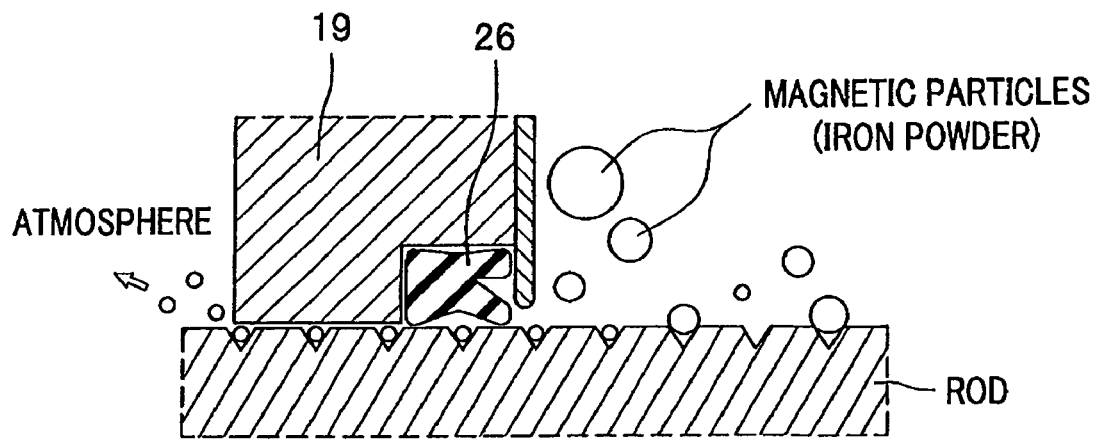
FIG. 6C is a section view of a reference example diagrammatically showing the structure of the piston rod and the sliding state of the rod guide section and the piston rod.

FIG. 6B is a section view showing a structure of the rod guide of the variable damping-force damper of the embodiment. Here, FIG. 6B is a section view taken along A-A in FIG. 6A that is a perpendicular partial section view including the axial core of the piston rod 13 and shows the structure of the piston rod 13 as well. The rod guide 19 shown in FIG. 6C has the structure in which the electroless nickel plating film 32 containing fluorine resin is formed on the inner peripheral surface (surface of a center hole) of a substantially cylindrical base material portion 31. Note that the "nickel plating" will be described as "Ni plating" and the electroless nickel plating film 32 containing fluorine resin" will be described as the "fluorine resin contained Ni plating film 32" hereinafter.

[Base Material Portion]

The variable damping-force damper 10 obtains the variable damping force by changing the viscosity of the MRF within the communication hole 35 by applying a magnetic field by the Ni plating film 22. Therefore, it is necessary not to apply any magnetic field to the MRF at parts other than the communication hole 35. Therefore, the rod guide 19 must be made of a non-magnetic material (non-ferromagnetic material). The base material portion 31 is also required to have mechanical characteristics, e.g., Vickers hardness, yield point, tensile strength and others, desired as a structural part.

Therefore, various non-magnetic metallic materials such as aluminum alloy (aluminum and aluminum alloy) and stainless steel are suitably for the base material portion 31. Preferably, aluminum alloy or the like is used in the present invention. The rod guide using the aluminum alloy or the like will be described later as a modified example of the present embodiment.

[Fluorine Resin Contained Ni Plating Film]

Tetrafluoride resin (PTFE) or the like is suitably used as the fluorine resin. The fluorine resin contained Ni plating film 32 has a coefficient of friction smaller than that of the electroless Ni plating film containing no fluorine resin, so that friction between the piston rod 13 and the rod guide 19 becomes small and sliding resistance may be reduced. Therefore, even if a side force acts on the piston rod 13 and the piston rod 13 is pressed against the rod guide 19, it becomes possible to suppress an increase of the sliding resistance between the piston rod 13 and the rod guide 19 and to reduce a drop of the operational accuracy with respect to an input signal.

The hardness of the fluorine resin contained Ni plating film 32 is preferable to be 360 VHN or more in terms of the Vickers hardness so that the fluorine resin contained Ni plating film 32 can have effective abrasion resistance against the magnetic particles when the magnetic particles infiltrate into the gap between the piston rod 13 and the rod guide 19. A thickness of the fluorine resin contained Ni plating film 32 is preferable to be 10 μm or more even though it depends on a size and an usable life of the variable damping-force damper 10.

[Manufacturing Method and Manufacturing Conditions of Rod Guide]

Figure 7:
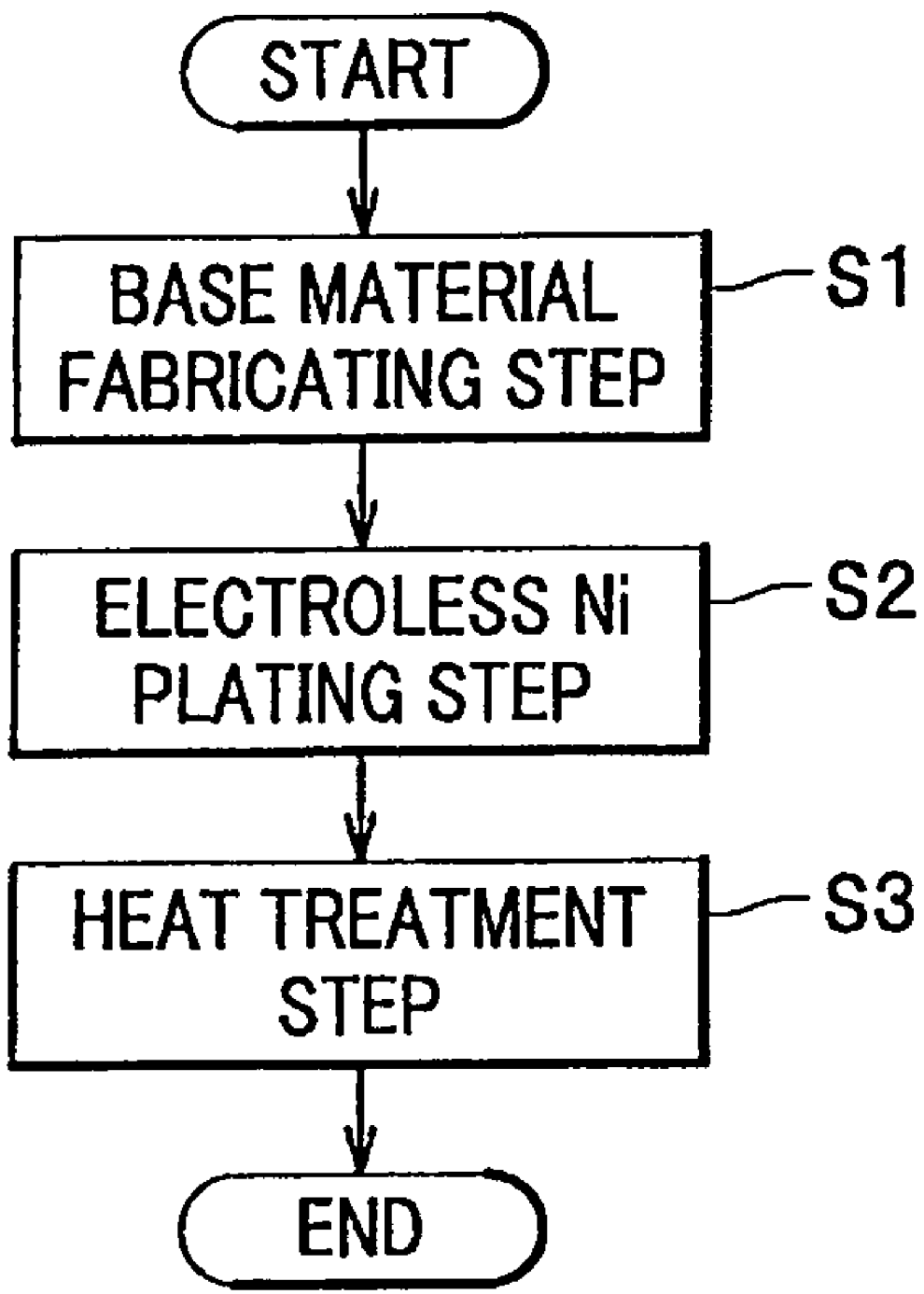
FIG. 7 is a flowchart showing a manufacturing method of the rod guide.

FIG. 7 is a flowchart showing a manufacturing method of the rod guide. The rod guide 19 is manufactured through a process including a base material portion fabricating step S1 of forming the base material portion 31, an electroless Ni plating step S2 of forming the fluorine resin contained Ni plating film 32 (before heat treatment) on the surface of the base material portion 31 formed in the base material portion fabricating step S1 that slides relative to the piston rod 13 and a heat treatment step S3 of implementing the heat treatment on the fluorine resin contained Ni plating film 32 (before the heat treatment) formed by the electroless Ni plating step S2.

The base material portion fabricating step S1 is carried out by mechanically machining a predetermined metal ingot (or a columnar steel bar) into a desirable cylindrical shape. The next s2 is carried out by using a plating solution prepared by adding and mixing an adequate amount of fluorine resin into an electroless Ni plating solution utilizing the reducing effect of the hypophosphorus and phosphorus and the fluorine resin are codeposited in precipitating Ni. It is possible to form the fluorine resin contained Ni plating film 32 (before the heat treatment) having an uniform thickness of a target thickness ±3 μm or so by the electroless Ni plating process as described above. Therefore, it is not necessary to adjust the thickness of the fluorine resin contained Ni plating film 32 by polishing such as honing after the electroless Ni plating step S2. Still more, it is not necessary to polish the surface because the electroless Ni plating process allows the surface roughness of the fluorine resin contained Ni plating film 32 to be kept low. Thus, it is possible to keep the production cost low.

The fluorine resin contained Ni plating film 32 (before the heat treatment) formed by the electroless Ni plating step S2 is noncrystalline and its hardness is not so high. Then, the fluorine resin contained Ni plating film 32 (before the heat treatment) is hardened by changing its nature from noncrystalline to crystalline by the heat treatment step S3. "Changing to crystalline" here means to "form a crystalline phase of $Ni_3P$." The heat treatment conditions are set within such a range that the crystalline phase of $Ni_3P$ is formed and no fluorine resin melts, liquating out of the fluorine resin contained Ni plating film 32 and aggregating together. Thus, the fluorine resin contained Ni plating film 32 (after the heat treatment) having a microstructure in which the crystal phase of $Ni_3P$ and the fluorine resin are homogeneously dispersed and the enhanced hardness is obtained. It is noted that the base material portion 31 is also heated at the same time in the heat treatment step S3, so that heat treatment temperature in the heat treatment step S3 must be decided by considering thermal characteristics such as fusion point, changes of mechanical characteristics caused by heating and others of the material used for the base material portion 31. The heat treatment step S3 is carried out at about 300° C. for about one hour for example.

<Packing>

The rod guide 19 is provided with a packing 26 on the side of the piston 16 as a sealing member for preventing the MRF from leaking out of the cylinder tube 12. The packing 26 is made of a rubber-base polymer material and is provided preferably on the side closer to the piston 16 than the fluorine resin contained Ni plating film 32. Thus, the packing 26 can prevent the magnetic particles from infiltrating into the sliding surface between the rod guide 19 and the piston rod 13 and to keep the abrasion of the both sliding surfaces of the rod guide 19 and the piston rod 13.

Next, a first modified example of the rod guide of the embodiment will be explained.

Figure 8A:
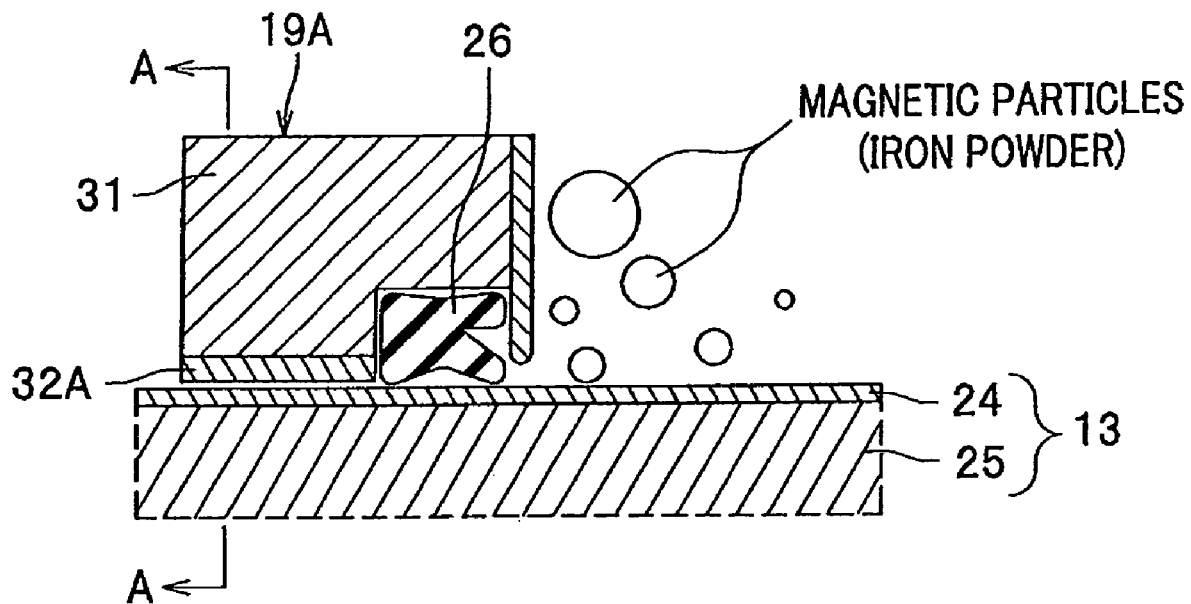
FIG. 8A is a perpendicular section view including an axial core of a piston rod showing a structure of a first modified example of the rod guide composing the variable damping-force damper of the embodiment.
Figure 8B:
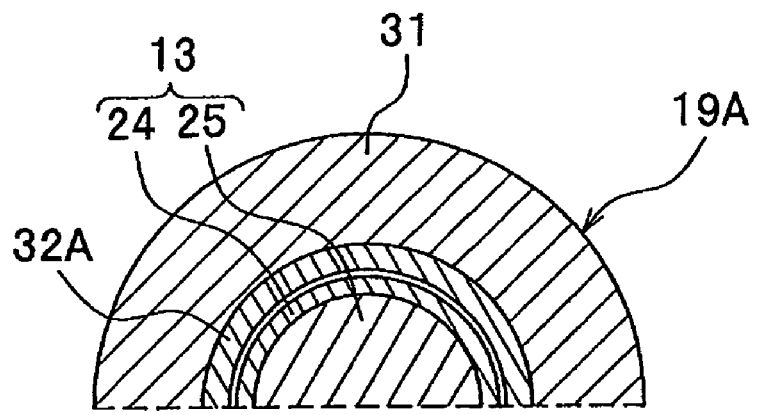
FIG. 8B is a section view showing the first modified example of the rod guide composing the variable damping-force damper of the embodiment taken along A-A in FIG. 8A.

FIGS. 8A and 8B are section views showing a structure of the rod guide of the first modified example of the present embodiment. FIGS. 8A and 8B are drawn similarly to FIGS. 6A and 6B. FIG. 8A is a perpendicular section view including the axial core of the piston rod and FIG. 8B is a section view taken along A-A in FIG. 8A. A rod guide 19A shown in FIGS. 8A and 8B has a structure in which an Ni plating film 32A is formed by means of the electroless Ni plating on the inner peripheral surface (surface of the center hole) of the substantially cylindrical base material portion 31.

[Base Material Portion]

Al alloy or the like, i.e., pure Al or Al alloy, is used for the base material portion 31 of the rod guide 19A. The pure Al contains inevitable impurities. The aluminum alloy contains Al as its main component, alloy ingredients such as copper (Cu), manganese (Mn), silicon (Si), magnesium (Mg), zinc (Zn), nickel (Ni) or the like and inevitable impurities. One of merits of using the aluminum alloy or the like for the base material portion 31 is that because the aluminum alloy or the like is inexpensive and is readily workable, it enables one having a desirable shape to be readily manufactured and hence excels in productivity. The aluminum alloy having well-balanced desired mechanical characteristics is suitably used for the base material portion 31 and specifically, JIS A6061 T6 series aluminum alloy may be used for example.

Another merit of using the aluminum alloy or the like for the base material portion 31 is that when the variable damping-force damper 10 is biased by the side force or the like, deformation (elastic deformation) of the aluminum alloy or the like can suppress an increase of the surface pressure at the surface where the rod guide 19A contacts with the piston rod 13 and can suppress an increase of the sliding resistance.

Figure 9A:
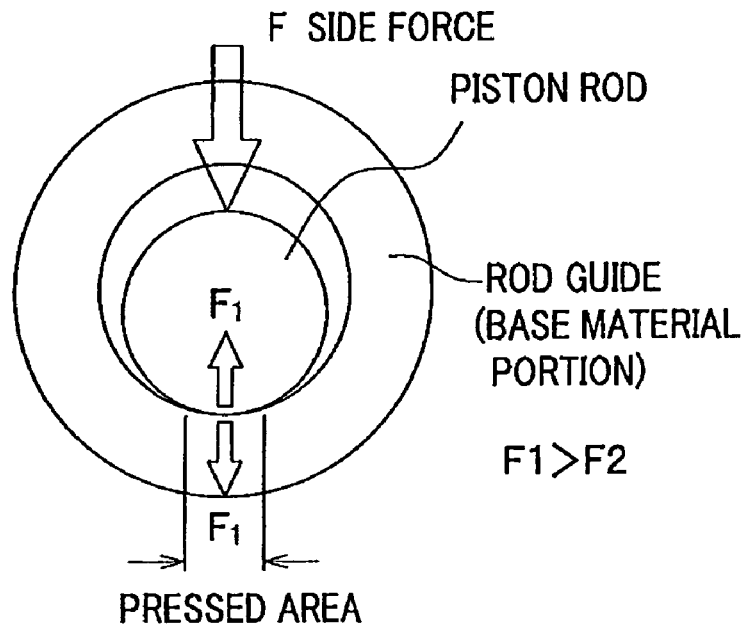
FIG. 9A is a section view of the rod guide including the axial core of the piston rod diagrammatically showing a state in which the piston rod is pressed by side force locally against the rod guide whose base material portion has large Young's modulus relatively in a radial direction thereof.
Figure 9B:
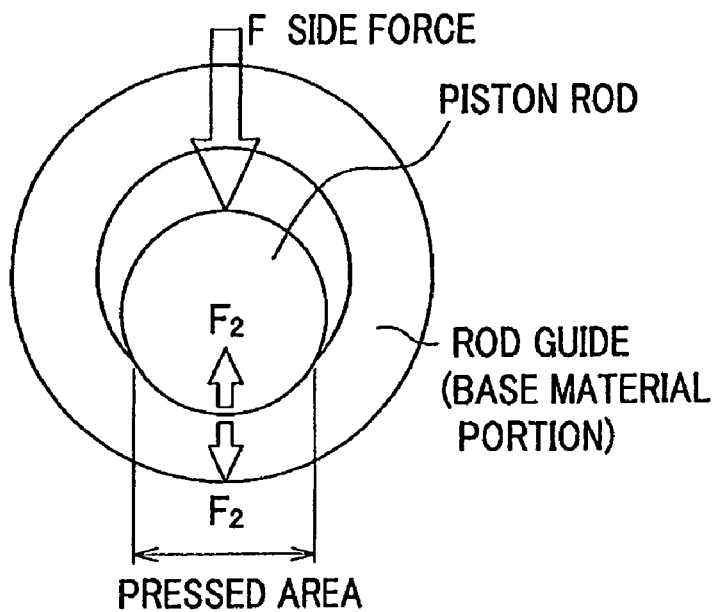
FIG. 9B is a section view of the rod guide including the axial core of the piston rod diagrammatically showing a state in which the piston rod is pressed by side force locally against the rod guide whose base material portion has small Young's modulus relatively in a radial direction thereof.

This effect will be explained with reference to FIGS. 9A and 9B. Note that a reference is made also to FIGS. 6A and 6B appropriately. FIGS. 9A and 9B diagrammatically show states in which the piston rod is pressed by the side force locally against the rod guide in a radial direction. FIG. 9A shows a case when Young's modulus of the base material portion is large (comparative example not belonging to the present invention and FIG. 9B shows a case when the Young's modulus of the base material of the rod guide is small (embodiment belonging to the invention). In order to signify only an effect brought about by the base material of the rod guide, FIGS. 9A and 9B show the rod guide composed of only the base material portion and the piston rod whose structure is simplified. Note that no reference numeral is denoted each component in FIGS. 9A and 9B.

The axial core of the piston rod coincides substantially with the axial core of the center hole of the rod guide in the state in which no side force F acts on the piston rod (see FIGS. 6A and 6B) and the surface pressure of the sliding surface of the piston rod and the rod guide in this state (referred to as a "surface pressure in the normal state" hereinafter) may be considered to vary less.

However, if the side force F acts on the piston rod as shown in FIGS. 9A and 9B, the piston rod moves in the radial direction. If the rod guide is immovable here, a part of the outer peripheral surface of the piston rod [a belt-like area whose longitudinal direction is in parallel with the axial core direction of the piston rod (referred to as a "pressed area" hereinafter)] is pressed against a part of the inner peripheral surface of the rod guide.

When the base material portion of the rod guide is made of a material, e.g., stainless steel or the like whose Young's modulus is large and that is hardly deformed by an external force, at this time, the rod guide receives a pressing force F from the piston rod by the narrow pressed area because the base material portion does not deform as shown in FIG. 9A. Then, a surface pressure F1 of the pressed area becomes very large as compared to the surface pressure in the normal time, increasing the sliding resistance between the piston rod and the rod guide. Operational accuracy of the variable damping-force damper with respect to an input signal (input of electric current to the magnetic coil 52) drops due to the increased sliding resistance in such a state. The abrasion in the pressed area also tends to advance in the both sides of the piston rod and rod guide.

When the base material portion is made of a material such as the aluminum alloy that is classified as having smaller Young's modulus among metal materials in contrary, a part of the rod guide pressed by the piston rod deforms elastically (dents) as shown in FIG. 9B. Thereby, a surface pressure F2 of a pressed area becomes smaller than the surface pressure F1 in the non-deformed state because the pressing force is relaxed and the pressed area is enlarged. Therefore, it is possible to suppress the increase of the sliding resistance between the piston rod and the rod guide and to keep the drop of the operational accuracy low with respect to the input signal in the case of the structure shown in FIG. 9B as compared to the case of the structure shown in FIG. 9A. Still more, it is possible to suppress the advance of the abrasion of the pressed area on the both sides of the piston rod and rod guide. It is noted that because the deformation of the base material portion shown in FIG. 9B is elastic deformation, the base material portion returns to the original state when the side force F (the pressing force from the piston rod) is released.

The Young's modulus of Al increases by alloying in general and the effect of suppressing the increase of the surface pressure of the pressed area by the elastic deformation described above decreases if the Young's modulus increases. Meanwhile, the rod guide 19A is required to have mechanical characteristics for supporting the piston rod 13. Therefore, it is preferable to consider their balance in selecting the aluminum alloy or the like to be used for the base material portion 31.

[Ni Plating Film]

When the base material portion 31 of the rod guide 19A is made of the aluminum alloy or the like and when the base material portion 31 slides directly relative to the piston rod 13, the aluminum alloy or the like tends to abrade because its hardness is small and there is a possibility that the abrasion of the sliding surface of the rod guide 19A is accelerated when the magnetic particles (iron powder) contained in the MRF enter the gap between the piston rod 13 and the rod guide 19A in particular. If the abrasion of the sliding surface of the rod guide 19A advances, there is a possibility that the magnetic particles are apt to enter between the gap between the piston rod 13 and the rod guide 19A, accelerating the abrasion of the sliding surface of the rod guide 19A even more.

Still more, if the abrasion of the sliding surface of the rod guide 19A advances and the clearance between the piston rod 13 and the rod guide 19A is widened, there is a possibility that the piston rod 13 becomes bumpy (wobbles) when the variable damping-force damper 10 is driven. The wobble of the piston rod 13 destabilizes the contact of the sliding surface of the piston rod 13 with the rod guide 19A and may cause biased abrasion. Still more, because the piston 16 tends to slide relative to the cylinder tube 12 in a state in which the axial core direction of the piston 16 crosses over the axial core direction of the cylinder tube 12 with a certain angle, the piston 16 and the cylinder tube 12 tend to cause biased abrasion, causing drops of the accuracy in controlling the damping force and of the durability.

Then, the Ni plating film 32A is provided on the inner peripheral surface (the inner surface of the center hole) of the rod guide 19A in order to enhance the abrasion resistance of the sliding surface of the rod guide 19A without hampering the effect of suppressing the increase of the surface pressure of the sliding surface between the piston rod 13 and the rod guide 19A by using the aluminum alloy or the like for the base material portion 31. Preferably, the hardness of the Ni plating film 32A is 360 VHN or more in terms of Vickers hardness from an aspect of effectively assuring the abrasion resistance against the magnetic particles.

While the Ni plating film 32A may be formed through the electroless Ni plating step S2 and the heat treatment step S3 (see FIG. 7 appropriately), it is arbitrary whether or not to add fluorine resin to the electroless Ni plating solution utilizing the reducing effect of the hypophosphorus in the electroless Ni plating step S2 here. That is, although the Ni plating film 32A must contain phosphorus, it may or may not contain fluorine resin. The heat treatment condition of the heat treatment step S3 may be changed depending on whether or not fluorine resin is contained in the Ni plating film 32A.

It is preferable to use the fluorine resin contained Ni plating film as the Ni plating film 32A because the sliding surface of the piston rod 13 and the rod guide 19A may be kept even low due to the small coefficient of friction of the fluorine resin contained Ni plating film.

A thickness of the Ni plating film 32A is set so that the function of suppressing the increase of the surface pressure of the sliding surface of the piston rod 13 and the rod guide 19A is fully exhibited and so that the Ni plating film 32A does not peel off or crack even when the rod guide 19A receives the pressing force from the piston rod 13 and the base material portion 31 elastically deforms. Still more, while the Ni plating film 32A is not what does not abrade at all and its thickness is thinned by temporal abrasion, the initial thickness of the Ni plating film 32A is set so that the Ni plating film 32A remains even when a predetermined usable life (usable years) elapses. Although the thickness of the Ni plating film 32A varies depending on the size, usable life and others of the variable damping-force damper 10, it is preferable to be 10 μm or more.

[Influence on Heat Treatment of Ni Plating Film on Al Alloy or the Like Used for Base Material]

The aluminum alloy or the like composing the base material portion 31 is heated by the heat treatment temperature during the heat treatment step S3 of the Ni plating film 32A. Because the aluminum alloy or the like is a material whose fusion point low among metallic materials, it is necessary to set the heat treatment conditions (temperature, time and others) so that the aluminum alloy or the like does not melt, soften or deforms.

The precipitation state of the alloy ingredients largely influences on the mechanical characteristics of the aluminum alloy.

Therefore, it is preferable to use one in which the alloy ingredients precipitate homogeneously in using the aluminum alloy for the base material portion 31. If the alloy ingredients precipitate homogeneously, it is possible to suppress moves caused by dislocation of various metal atoms composing the aluminum alloy and to keep the mechanical characteristics. To that end, it is preferable to balance the composition and others of the aluminum alloy and the heat treatment conditions of the Ni plating film 32A so that the precipitation state of the alloy ingredients in the aluminum alloy does not change as much as possible by the heat treatment step S3 of the Ni plating film 32A. Note that it is also possible to arrange so that the alloy ingredients precipitate homogeneously in the aluminum alloy during the heat treatment process of the Ni plating film 32A.

A solid solution state of the alloy ingredients also largely influences on the mechanical characteristic of the aluminum alloy. Therefore, it is preferable to arrange so that the alloy ingredients precipitated in the aluminum alloy do not become the solid solution state in Al (a state in which the alloy ingredients melt homogeneously into Al) by the heat treatment step S3 of the Ni plating film 32A in using the aluminum alloy in which the alloy ingredients precipitate. It allows the mechanical characteristics of the aluminum alloy to be kept.

Note that it is also preferable to suppress segregation of the alloy ingredients and to prevent the mechanical characteristics from dropping in the heat treatment step S3 of the Ni plating film 32A in using the aluminum alloy for the base material portion 31. The segregation refers to inhomogeneous precipitation of the alloy ingredients and includes cases when the alloy ingredients that have been homogeneously precipitated beforehand by an ageing treatment in the manufacturing process of the aluminum alloy distribute inhomogeneously due to aggregation or the like and when the alloy ingredients that have been homogeneously solid-soluble in Al are precipitated inhomogeneously. Note that the segregation of the alloy ingredients may be readily verified from a result or the like of plane analysis performed on a distribution of elements by means of a SEM-EDX or the like for example. Whether or not the segregation of the alloy ingredients is occurring by the heat treatment step S3 may be determined from changes of texture of the aluminum alloy before and after the heat treatment step S3 and from the drop of the mechanical characteristics.

Still more, because the aluminum alloy or the like is a heat-treated material (whose mechanical characteristics are adjusted) by the heat treatment, it is necessary to avoid a case of dropping the mechanical characteristics or losing the desirable mechanical characteristics of the aluminum alloy or the like composing the base material portion 31 by the heat treatment step S3. When the aluminum alloy is used for the base material portion 31 and the Ni plating film 32A is heat-treated at temperature around an annealing condition of the aluminum alloy for example, there is a possibility that the aluminum alloy is softened and loses the mechanical characteristics required as the rod guide 19A. Therefore, it is preferable to set the heat treatment temperature of the heat treatment step S3 at temperature by which the aluminum alloy or the like composing the base material portion 31 is not annealed. In other words, it is preferable to select the aluminum alloy or the like, used as the base material portion 31, having the composition that causes substantially no change in the mechanical characteristics under the heat treatment condition by which the Ni plating film 32A would have the desirable hardness.

Next, a second exemplary modification of the rod guide of the present embodiment will be explained.

Figure 10A:
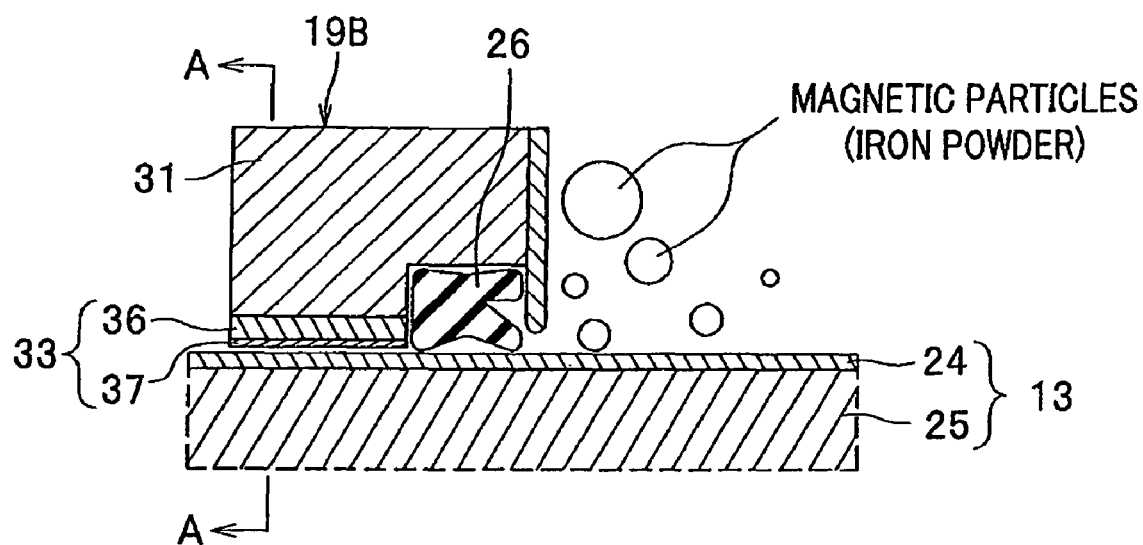
FIG. 10A is a perpendicular section view including an axial core of a piston rod showing a structure of a second modified example of the rod guide composing the variable damping-force damper of the embodiment.
Figure 10B:
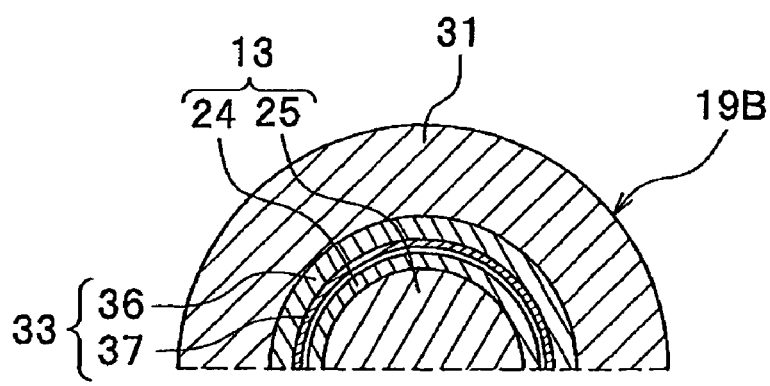
FIG. 10B is a section view showing the second modified example of the rod guide composing the variable damping-force damper of the embodiment taken along A-A in FIG. 10A.

FIGS. 10A and 10B are both section views showing a structure of the rod guide. FIG. 10A is a perpendicular section view including the axial core of the piston rod and FIG. 10B is a section view taken along A-A in FIG. 10A. A rod guide 19B shown in FIGS. 10A and 10B has a structure in which an Ni plating film 33A having a two-layered structure (referred to as a "two-layered Ni plating film 33" hereinafter) is formed on the inner peripheral surface (surface of the center hole) of the substantially cylindrical base material portion 31. The two-layered plating film 33 is composed of a first electroless Ni plating layer 36 (described as the "first plating layer 36" hereinafter) formed on the surface of the base material portion 31 and containing phosphorus (P) and a second electroless Ni plating layer 37 (described as the "second plating layer 37" hereinafter) formed on the surface of the first plating layer 36 and containing fluorine resin.

The first plating layer 36 contains no fluorine resin, so that it may be formed by using the electroless Ni plating solution utilizing the reducing effect of the hypophosphorus. Meanwhile, the second plating layer 37 is the same with the fluorine resin contained Ni plating film 32 provided on the rod guide 19 and a forming method thereof conforms to the method for forming the fluorine resin contained Ni plating film 32 as described above. It is noted that a manufacturing method of the two-layered plating film 33 may be carried out in order from an electroless Ni plating process of the first plating layer 36, a heat treatment, an electroless Ni plating process and a heat treatment or in order from the electroless Ni plating process of the first plating layer 36, the electroless Ni plating process and the heat treatment.

When the two-layered plating film 33 is used, its manufacturing condition is adjusted so that Vickers hardness of the first plating layer 36 becomes larger than that of the second plating layer 37. It allows the drop of the operational accuracy with respect to the input signal to be kept low because the sliding resistance is kept low since the second plating layer 37 containing the fluorine resin slides relative to the piston rod 13 in an initial stage of usage and suppresses an increase of the sliding resistance between the piston rod 13 and the rod guide 19B even in a state when a side force or the like acts on the piston rod 13.

Then, the second plating layer 37 abrades with time and the first plating layer 36 comes to slide relative to the piston rod 13, a clearance between the piston rod 13 and the rod guide 19B is widened. Although there is a possibility that the magnetic particles tend to enter the widened clearance, advancing the abrasion of the sliding surface, the first plating layer 36 that is superior than the second plating layer 37 in terms of abrasion resistance is exposed at this time, so that the first plating layer 36 suppresses the advance of abrasion of the rod guide 19B and maintains the durability. It is also possible to suppress an increase of a surface pressure (increase of the sliding resistance) of a contact surface between the piston rod 13 and the rod guide 19B by utilizing elastic deformation of the aluminum alloy or the like even when the side force or the like acts by using the base material portion 31 composed of the aluminum alloy or the like is used for the rod guide 19B.

[Embodiments]

Firstly, a result of a durability test of the Ni plating film formed on the inner peripheral surface of the cylinder tube will be explained by assuming a case when the variable damping-force damper is used as a suspension of a vehicle.

<Fabrication of Variable-damping Force Damper>
[Variable-damping Force Damper of First Embodiment]

A Ni plating film was formed on an inner peripheral surface of a cylinder base material made of a steel pipe for general structure so that its average thickness becomes 40 μm with forming speed of 0.1 μm/min. by using an electroless Ni plating solution and was then heat-treated in 315 to 327° C. for two hours. Thus, the cylinder tube having the Ni plating film (Ni—P plating film) whose Vickers hardness is 900 VHN and whose surface roughness (average height of+point Rz) is 1.3 μm and inner diameter of about φ 46 mm (tolerance: less than 5 μm) was obtained. It is noted that the Vickers hardness and the surface roughness of the Ni plating film were measured respectively by means of a commercially available Vickers hardness tester and a surface roughness meter by using a Ni plating film formed by simultaneously treating a flat plate made of a steel plate for general structure, i.e. the same material with the cylinder base material. It was confirmed that the crystal phase of $Ni_3P$ had been formed when a phase of the Ni plating film formed on the flat plate was identified by XRD.

A piston was prepared so that it has the structure shown in FIG. 2, its diameter is about 45.9 mm so that the clearance between the sliding portion of the piston and the inner peripheral surface of the cylinder tube becomes about 50 μm, its length of the piston sliding portion L is 13 mm and it has a piston ring made of S25C (carbon steel for mechanical structure). A free piston made of aluminum and is provided with an O-ring that slides relative to the Ni plating film was prepared. The variable damping-force damper (see FIG. 1 appropriately) of the first embodiment was fabricated by using these parts. Then, the first and second oil chambers of the variable damping-force damper were filled with the MRF.

[Variable-damping Force Damper of Second Embodiment]

A Ni plating film was formed on an inner peripheral surface of a cylinder base material that is the same one with the cylinder base material used in the fabrication of the variable damping-force damper of the first embodiment so that its average thickness becomes 40 μm with forming speed of 0.1 μm/min. by using a plating solution in which BN powder is dispersed in the electroless Ni plating solution used in the first embodiment and was then heat-treated in 315 to 327° C. for two hours. Thus, the cylinder tube having the Ni plating film (Ni—P+BN plating film) whose Vickers hardness is 900 VHN and whose surface roughness (average height of+point Rz) is 1.3 μm and an inner diameter of about φ46 mm (tolerance: less than 5 μm) was obtained. The variable damping-force damper of the second embodiment was fabricated by using the cylinder tube and a piston equivalent to the piston used in the fabrication of the variable damping-force damper of the first embodiment.

[Variable-damping Force Damper of Comparative Example]

A Cr plating film was formed on an inner peripheral surface of a cylinder base material that is the same one with the cylinder base material used in the fabrication of the variable damping-force damper of the first embodiment so that its average thickness becomes 100 μm by means of electroplating. The Cr plating film thus formed had 900 to 1000 VHN of Vickers hardness. Successively, homing was implemented on the Cr plating film so that an inner diameter of the cylinder tube becomes about φ 46 mm (tolerance: less than 5 μm). The variable damping-force damper of the comparative example was fabricated by using this cylinder tube and the piston equivalent to the piston used in the fabrication of the variable damping-force damper of the first embodiment.

<Condition of Durability Test>

Conforming to the method of the durability test previously explained with reference to FIG. 3, a test was carried out on the variable damping-force damper of the first embodiment by reciprocating the sliding portion of the piston within the piston sliding range of 70 mm in terms of the length of the cylinder tube in the axial core direction in the state when the certain side force F (load) is applied in one radial direction (perpendicularly downward direction) of the piston. After ending the test, the inner diameters of the cylinder tube 12 in the F-direction, in the 45° direction, in the 90° direction and in the piston rod 135° direction (see FIG. 4 appropriately) were measured at predetermined intervals in the axial core direction of the cylinder tube by using the commercially available cylinder gauge and the like (measured minimum unit: 1 μm, measuring error; 1 μm.

<Result of Durability Test>

[Relationship Between Thickness of Ni Plating Film and Length of Piston Sliding Portion L]

FIG. 11 is a graph showing changes of each inner diameter of the cylinder tube in the axial core direction after the durability test of the variable damping-force damper of the first embodiment. In FIG. 11, variation of each inner diameter after the durability test represents the abrasion Δt of the Ni plating film. It can be seen that a maximum value in the changes of the inner diameter of the cylinder tube within the piston sliding range is about 32 μm in the inner diameter in the F-direction. There is no big change before and after the durability test in the inner diameter in the 90° direction. It happens possibly because the sliding surface of the piston does not contact substantially with the inner peripheral surface of the cylinder tube in the direction of the inner diameter of 90°. It also suggests that substantially no abrasion of the Ni plating film otherwise caused by the magnetic particles contained in the MRF has occurred.

As shown in FIG. 11, there appears a tendency that the changes of the inner diameters of a center area of the piston sliding range are larger than the changes of the inner diameters in edge areas (the abrasion of the Ni plating film 22 increases). It happens possibly because sliding speed at the center area is high and because the whole length of the piston passes there.

When a plurality of variable damping-force dampers of the first embodiment was fabricated and the durability test described above was carried out on each variable damping-force damper, an average value of the abrasion Δt of the Ni plating film was 30 μm. Then, based on the abrasion Δt of the Ni plating film=30 μm, a relationship between the length of the piston sliding portion L and a least minimum thickness required for the Ni plating film was found.

The surface pressure PMEAN between the piston ring and the Ni plating film in this durability test was calculated as 6.73 Mpa from Equations 1 through 6 described above. Note that values of the piston ring and the Ni plating film were set as follows: the Young's modulus of the electroless Ni plating step S25C used for the piston ring E1=210 Gpa and its Poisson's ratio v1=0.29, the Young's modulus of the Ni plating film E2=219 Gpa and its Poisson's ratio v2=9.31 and the radius of the piston ring R1=22.95 mm and the radius of the Ni plating film R2=23 mm.

Figure 12:
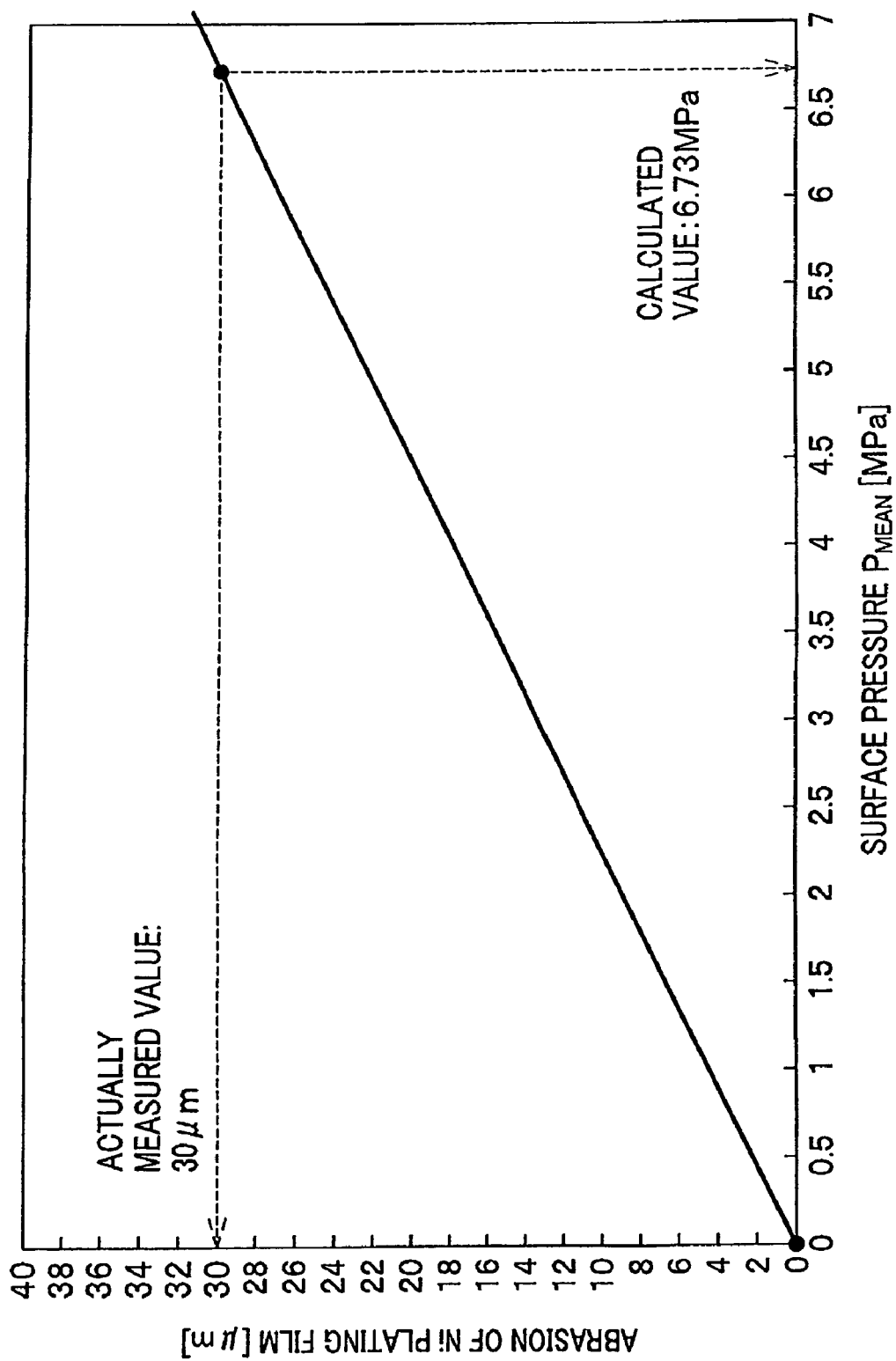
FIG. 12 is a graph showing a relationship between abrasion Δt of a Ni plating film and surface pressure PMEAN in the variable damping-force damper of the first embodiment.
Figure 13:
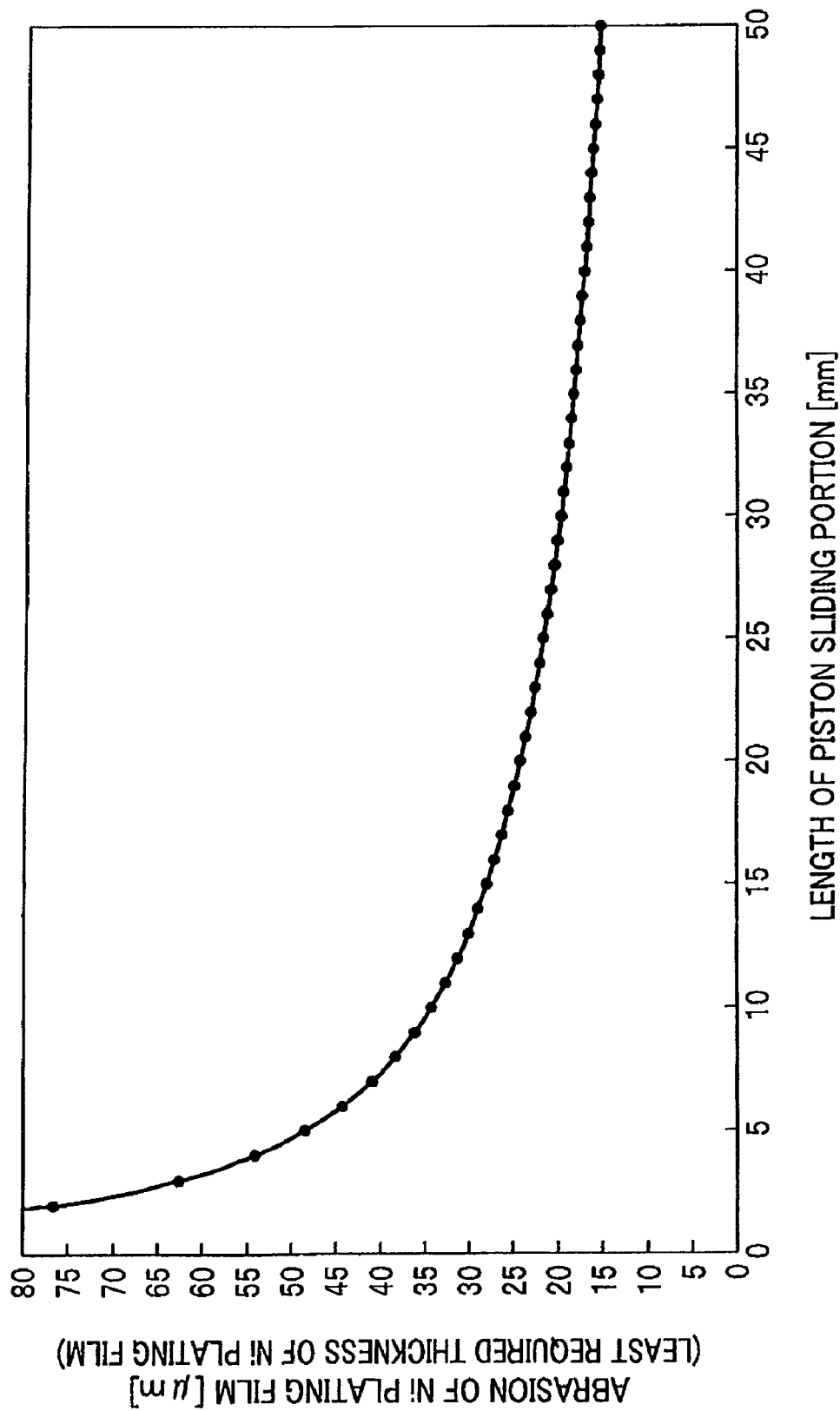
FIG. 13 is a graph showing a relationship between the abrasion Δt of the Ni plating film and a length of a piston sliding portion in the variable damping-force damper of the first embodiment.

FIG. 12 is a graph showing the relationship between the abrasion Δt of the Ni plating film and the surface pressure PMEAN. Assuming that the abrasion Δt of the Ni plating film is a linear function of the surface pressure PMEAN from Eq. 7 described above, its coefficient K was found to be "K=4.46 [μum/Mpa]." The relationship between the abrasion Δt of the Ni plating film and the length of the piston sliding portion L was found from Eq. 8 described above by using this coefficient K. FIG. 13 is a graph showing the result thereof. From the result shown in FIG. 13, it was found that when the length of the piston sliding portion L is 50 mm, the abrasion Δt of the Ni plating film is 15 μm, i.e., that the required least minimum thickness of the Ni plating film must be 15 μm.

It is noted that the result shown in FIG. 12 is that of the case when the Ni—P plating film was used as the Ni plating film. The required least minimum thickness of the Ni plating film may be found even when the Ni plating film containing various additional ingredients described above is used by carrying out the similar test.

[Aggression of Ni Plating Film Against Piston Ring]

Figure 14:
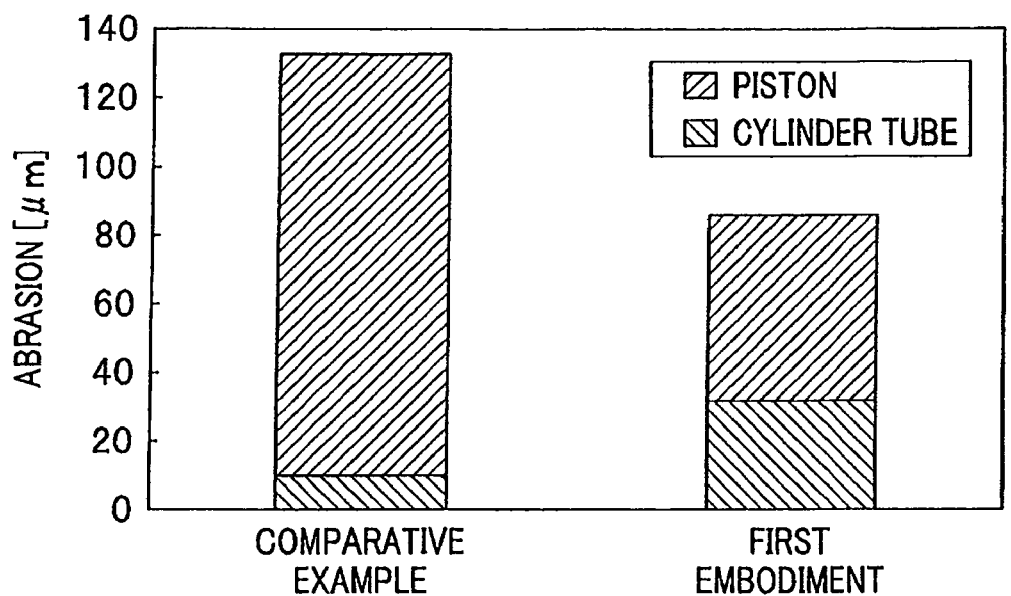
FIG. 14 is a graph showing total abrasion of a piston ring and the Ni plating film in each variable damping-force damper of the first embodiment and a comparative example.

When the abrasion of the sliding surface in the piston ring was measured after the durability test of the variable damping-force damper of the first embodiment, the maximum abrasion was about 56 μm in average. Accordingly, a total abrasion of the Ni plating film is about 86 μm. FIG. 14 shows a graph representing the total abrasion.

A durability test was carried out on the variable damping-force damper of the comparative example under the same conditions with the durability test on the variable damping-force damper 10 of the first embodiment. As a result, the abrasion of the Cr plating film was about 8 μm in the inner diameter of the F-direction. Meanwhile, the abrasion of the sliding surface of the piston ring was about 126 μm. FIG. 14 also shows a graph showing this total abrasion.

As it is apparent from FIG. 14, although the abrasion of the Cr plating film itself is very small, the abrasion of the piston ring that is a sliding mating member is large in the variable damping-force damper of the comparative example. In contrary to that, because the abrasion of the piston ring is kept small in the variable damping-force damper of the first embodiment, it was confirmed that the aggression of the Ni plating film against the piston ring became low. That the total abrasion of the piston ring and the Ni plating film is low indicates that change of the clearance between the inner peripheral surface of the cylinder tube and the outer peripheral surface of the piston is small. Therefore, it was confirmed that the variable damping-force damper of the first embodiment can suppress the MRF from freely moving between the first and second oil chambers through the clearance part for a long period of time and can maintain the damping force for a long period of time.

[Reduction of Friction of Ni Plating Film by Adding Ingredients]

Figure 15:
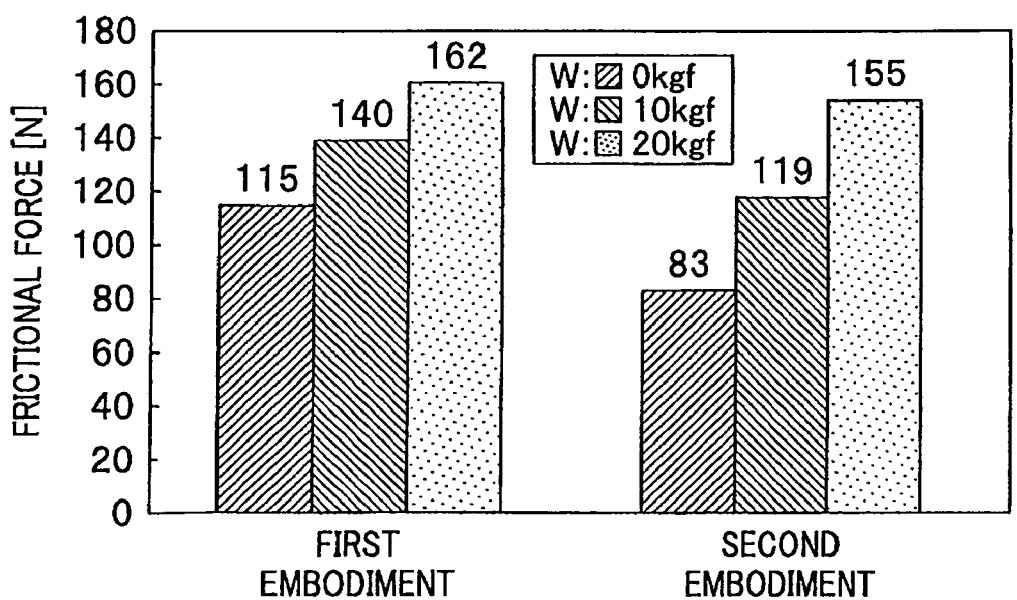
FIG. 15 is a graph showing magnitude of friction between the cylinder tube and the piston in each variable damping-force damper of the first and second embodiments.

Magnitude of the friction between the cylinder tube and the piston when the magnitude of the side force F is respectively set at 0 kgf, 10 kgf (=98.07 N) and 20 kgf (=196.13 N) was measured on the variable damping-force dampers of the first and second embodiments. FIG. 15 is a graph showing its result. As shown in FIG. 15, the friction is small in the variable damping-force damper of the second embodiment as compared to that of the variable damping-force damper of the first embodiment and the effect of reducing the coefficient of friction by BN was confirmed. It becomes possible to reduce not only the abrasion of the Ni plating film but also the abrasion of the piston ring by thus reducing the friction between the cylinder tube and the piston.

Next, a result of evaluation of the friction between the piston rod and the rod guide when the side force is added to the variable damping-force damper of the embodiment will be explained.

Figure 16:
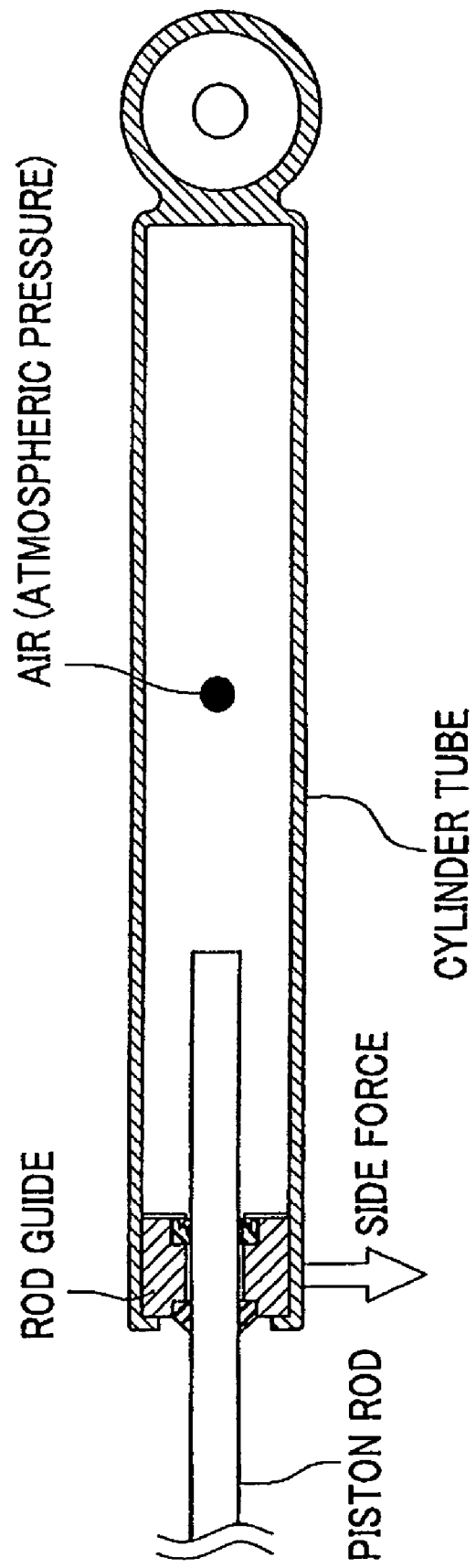
FIG. 16 is a section view of the variable damping-force damper schematically showing a testing method for measuring friction between the piston rod and the rod guide.

FIG. 16 is a section view of the variable damping-force damper schematically showing a testing method for measuring the friction between the piston rod and the rod guide. This friction evaluation test was carried out by preparing a rod guide in which fluorine resin hard alumite (comparative example), a fluorine resin contained Ni plating film (third embodiment) and a fluorine resin bearing (comparative example) are provided respectively on the sliding surface of the rod guide relative to the piston rod and by measuring the friction when the piston rod is slid relative to the rod guide in a state in which no piston is attached as shown in FIG. 16, no MRF is filled within the cylinder tube and the side force of a predetermined magnitude is acted on a part of the cylinder tube where the rod guide is positioned.

It is noted that the aluminum alloy was used for the base material portion composing the rod guide to evaluate the effect of suppressing an increase of the friction of various films provided on the sliding surface of the rod guide against the side force. The piston rod made of low-carbon steel, e.g., S45C, and having a hard Cr plating film provided on the surface thereof was used. This test was carried out under the following conditions:

Lubricant environment (sliding surface of the piston rod and the rod guide): dry (no lubricant is used)

Magnitude of side force: three magnitudes of 0, 10 and 15 kgf (=0, 98 and 196 N)

Sliding speed: 0.005 m/sec.

Sliding displacement: ±5 mm

Figure 17:
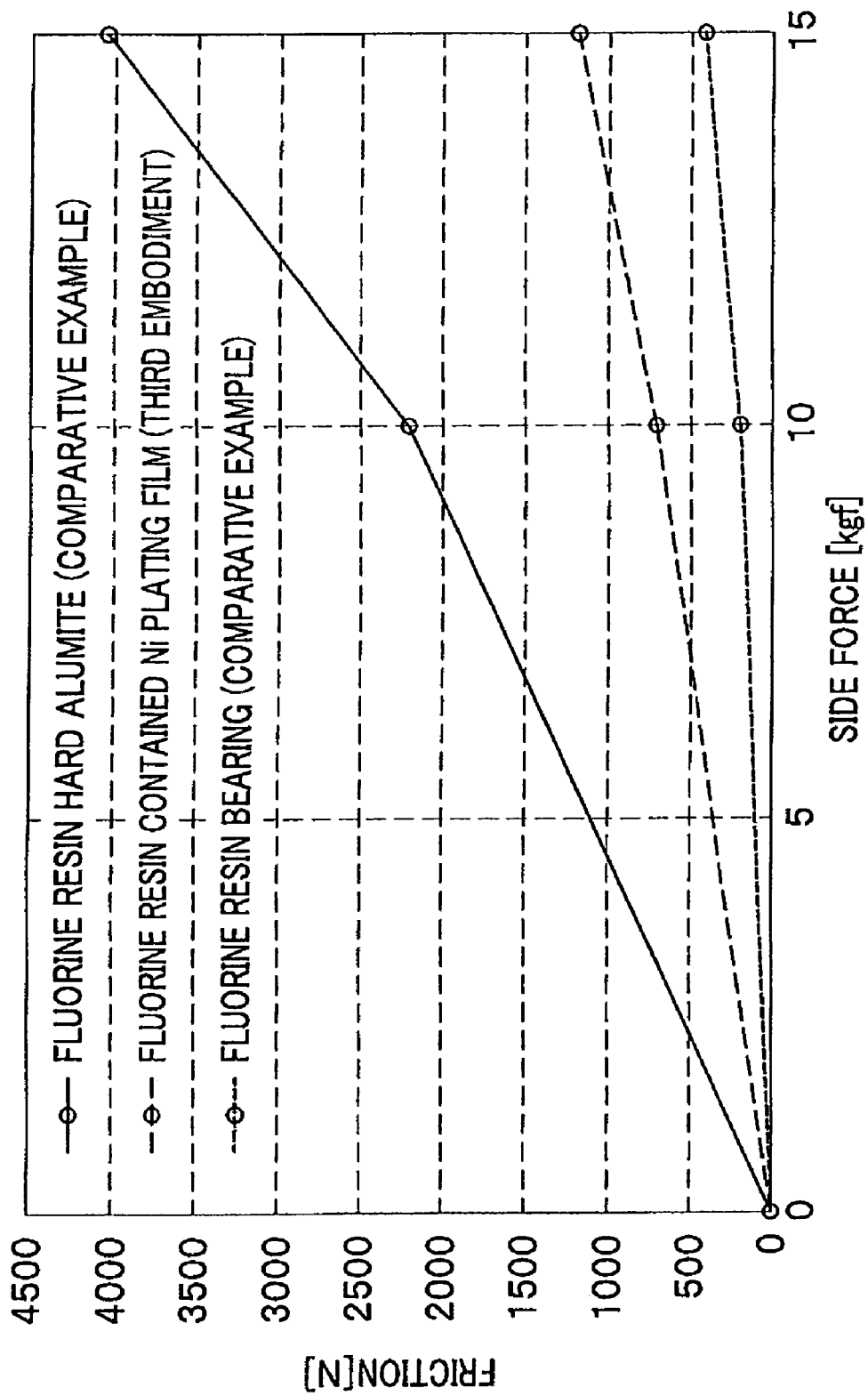
FIG. 17 is a graph showing measured test results of the frictions.

FIG. 17 is a graph showing measured test results. As it is apparent from FIG. 17, the fluorine resin contained Ni plating film significantly suppresses an increase of the friction as compared to the fluorine resin hard alumite. It was confirmed from the fact that the variable damping-force damper whose operation accuracy with respect to an input signal drops less even when the sliding surface acts may be realized. It is noted that although an absolute value of the friction is least when the fluorine resin bearing is used, the fluorine resin bearing is not suitable for the variable damping-force damper using the MRF because it is soft and is inferior in terms of the abrasion resistance as explained in the background art of the invention.

It is apparent from an aspect of material property that the fluorine resin contained Ni plating film is superior in terms of the abrasion resistance than the fluorine resin hard alumite because the Vickers hardness of the fluorine resin contained Ni plating film is about 1.5 times of that of the fluorine resin hard alumite. Accordingly, it may be determined to be preferable to use the fluorine resin contained Ni plating film rather than the fluorine resin hard alumite.

It is noted that although the mode described above is the best mode for carrying out the invention, it is not intended to limit the invention to such mode. Accordingly, the mode for carrying out the invention may be variously modified within a scope in which the subject matter of the invention is not changed.

What is claimed is:

1. A variable damping-force damper, comprising:
   a cylinder tube filled with a working fluid that is a magnetic fluid or a magneto-rheological fluid containing magnetic particles; and
   a piston that partitions an inside of the cylinder tube into first and second chambers, has a communication hole for circulating the work fluid between the first and second chambers and has an electromagnetic coil that applies a magnetic field to the work fluid within the communication hole;
   the variable damping-force damper controlling a damping force by changing viscosity of the work fluid within the communication hole by feeding power to the electromagnetic coil;
   wherein the variable damping-force damper has a sliding surface that slides under an influence of the magnetic particles during contraction;
   the sliding surface has a heat-treated nickel plating film on the surface thereof;
   wherein the sliding surface is an outer peripheral surface of the piston or an inner peripheral surface of the cylinder tube and the Ni plating film is provided at least on the inner peripheral surface of the cylinder tube;
   wherein a thickness of the Ni plating film is 15 μm or more when a length of sliding portion of the piston in an axial core direction is 50 mm; and
   when the length of the sliding portion is shorter than 50 mm, the thickness of the Ni plating film is set such that the shorter the length of the sliding portion, the thicker the thickness of the Ni plating film becomes beyond 15 μm.

2. The variable damping-force damper according to claim 1, wherein the Ni plating film contains phosphorus and one or a plurality of elements or chemical compounds selected from boron, tungsten, boron nitride and silicon carbide.

3. The variable damping-force damper according to claim 1, wherein the Vickers hardness of the Ni plating film formed on the inner peripheral surface of the cylinder tube is 800 VHN or more.

4. The variable damping-force damper according to claim 1, further comprising a piston rod whose one end is attached to the piston and whose other end extends to an outside of the cylinder tube;
   wherein the cylinder tube has a cylindrical rod guide section disposed at one end of the tube so that the piston rod is inserted through the rod guide; and
   the Ni plating film is also provided on the outer peripheral surface of the piston rod.

5. The variable damping-force damper according to claim 1, further comprising a piston rod whose one end is attached to the piston and whose other end extends to an outside of the cylinder tube;
   wherein the cylinder tube has a cylindrical rod guide section disposed at one end of the tube so that the piston rod is inserted through the rod guide; and
   at least the rod guide has a heat-treated electroless Ni plating film that contains phosphorus and fluorite resin on an interfacial sliding surface of an outer peripheral surface thereof.

6. The variable damping-force damper according to claim 5, wherein the rod guide has a base material portion made of aluminum or aluminum alloy;
   the electroless Ni plating film containing phosphorus and fluorite resin is formed on a predetermined surface of the base material portion; and
   the piston rod slides relative to the electroless Ni plating film containing phosphorus and fluorite resin.

7. The variable damping-force damper according to claim 6, wherein the base material portion is made of the aluminum alloy and precipitates alloy ingredients other than aluminum.

8. The variable damping-force damper according to claim 6, wherein the electroless Ni plating film containing phosphorus and fluorite resin has:
   a first electroless Ni plating layer formed on the surface of the base material portion and containing phosphorus; and
   a second electroless Ni plating layer formed on the surface of the first electroless Ni plating layer and containing phosphorus and fluorine resin;
   wherein the first electroless Ni plating layer has a hardness that is harder than that of the second electroless Ni plating layer.

9. The variable damping-force damper according to claim 5, further comprising a sealing member provided in the rod guide to prevent the working fluid from leaking out of the cylinder tube;
   wherein the sealing member is provided on the side closer to the piston rather than the electroless Ni plating film containing phosphorus and fluorite resin in the axial core direction of the cylinder tube.

10. The variable damping-force damper according to claim 5, wherein the piston rod is provided with an electroless Ni plating film or a Cr plating film on the sliding surface that slides relative to the rod guide;

wherein the electroless Ni plating film or the Cr plating film on the piston rod has a thickness of 10 μm or more and a surface roughness of 0.1 to 1.5 in terms of a Rz value.

11. The variable damping-force damper according to claim 1, wherein when the length of the piston sliding portion is shorter than 50 mm, the thickness of the Ni plating film is set so that the shorter the length of the piston sliding portion L becomes below 50 mm, the thickness of the Ni plating film is increased so that it becomes inversely proportional to a square root of the length of the piston sliding portion.

* * * * *